United States Patent
Moon

(10) Patent No.: US 12,207,224 B2
(45) Date of Patent: Jan. 21, 2025

(54) METHOD AND DEVICE FOR CONTROLLING UPLINK INTERFERENCE OF TERMINAL INFORMATION-COLLECTING DEVICE IN WIRELESS COMMUNICATION SYSTEM

(71) Applicants: IUCF-HYU (INDUSTRY-UNIVERSITY COOPERATION FOUNDATION HANYANG UNIVERSITY), Seoul (KR); INFOSEIZE SYSTEMS CO. LTD., Seoul (KR)

(72) Inventor: Hi Chan Moon, Seoul (KR)

(73) Assignees: IUCF-HYU (INDUSTRY-UNIVERSITY COOPERATION FOUNDATION HANYANG UNIVERSITY), Seoul (KR); INFOSEIZE SYSTEMS CO. LTD., Seoul (KR)

(*) Notice: Subject to any disclaimer, the term of this patent is extended or adjusted under 35 U.S.C. 154(b) by 741 days.

(21) Appl. No.: 17/269,297

(22) PCT Filed: Aug. 20, 2019

(86) PCT No.: PCT/KR2019/010591
§ 371 (c)(1),
(2) Date: Feb. 18, 2021

(87) PCT Pub. No.: WO2020/040531
PCT Pub. Date: Feb. 27, 2020

(65) Prior Publication Data
US 2021/0185636 A1     Jun. 17, 2021

(30) Foreign Application Priority Data

Aug. 20, 2018 (KR) .................. 10-2018-0096679
Sep. 27, 2018 (KR) .................. 10-2018-0114866
Aug. 19, 2019 (KR) .................. 10-2019-0101424

(51) Int. Cl.
*H04W 64/00* (2009.01)
*H04B 17/336* (2015.01)
(Continued)

(52) U.S. Cl.
CPC ........ *H04W 64/006* (2013.01); *H04B 17/336* (2015.01); *H04W 24/10* (2013.01);
(Continued)

(58) Field of Classification Search
CPC ............... H04W 64/006; H04W 24/10; H04W 72/0453; H04W 72/21; H04W 72/541;
(Continued)

(56) References Cited

U.S. PATENT DOCUMENTS 7,974,652 B2 * 7/2011 Gerlach ............... H04W 72/541
455/522
8,700,046 B2 * 4/2014 Ebiko ................. H04W 72/541
455/452.2
(Continued)

FOREIGN PATENT DOCUMENTS

CN     105163390 A    12/2015
EP     3 012 989 A1    4/2016
(Continued)

OTHER PUBLICATIONS

International Search Report for PCT/KR2019/010591 dated Nov. 27, 2019 [PCT/ISA/210].

*Primary Examiner* — Brian T O Connor
(74) *Attorney, Agent, or Firm* — Sughrue Mion, PLLC

(57) ABSTRACT

The present disclosure relates to a method and a device for acquiring location information of a terminal by using a wireless communication system. A signal measurement device comprises: an information acquisition unit for acquiring at least one among an uplink signal of a target terminal, or identification information of a terminal which is potentially an interference source in the transmission of the uplink signal; a communication unit capable of communicating with a base station or a location measurement server; and a control unit for, on the basis of the uplink signal, generating
(Continued)

information on the occurrence of an interference to the uplink signal of the target terminal, or generating interference source information including the identification information of the terminal which is potentially an interference source.

11 Claims, 17 Drawing Sheets

(51) Int. Cl.
    *H04W 24/10*         (2009.01)
    *H04W 72/0453*    (2023.01)
    *H04W 72/21*         (2023.01)
    *H04W 72/541*     (2023.01)
    *H04W 76/11*         (2018.01)

(52) U.S. Cl.
    CPC ....... *H04W 72/0453* (2013.01); *H04W 72/21* (2023.01); *H04W 72/541* (2023.01); *H04W 76/11* (2018.02)

(58) Field of Classification Search
    CPC ... H04W 76/11; H04W 64/003; H04W 24/02; H04W 64/00; H04W 72/23; H04B 17/336; H04B 17/318; H04B 17/345; H04J 11/00; H04J 11/0023; H04J 2211/005
    See application file for complete search history.

(56) References Cited

U.S. PATENT DOCUMENTS

| | | | | |
|---|---|---|---|---|
| 9,526,108 B2 * | 12/2016 | Chang | .................. | H04W 16/10 |
| 9,743,412 B2 * | 8/2017 | Yanagisawa | ........ | H04W 64/003 |
| 10,172,142 B2 * | 1/2019 | Liu | ..................... | H04W 72/541 |
| 10,305,649 B2 * | 5/2019 | Fang | .................... | H04W 72/541 |
| 11,985,570 B2 * | 5/2024 | Moon | ................... | G01S 5/0236 |
| 11,997,559 B2 * | 5/2024 | Moon | ..................... | G01S 19/01 |
| 12,041,578 B2 * | 7/2024 | Edge | .................... | H04L 43/0864 |
| 2012/0015664 A1 | 1/2012 | Han | | |
| 2012/0099503 A1 | 4/2012 | Guo et al. | | |
| 2012/0135743 A1 * | 5/2012 | Ebiko | ................. | H04W 72/541 |
| | | | | 455/452.2 |
| 2012/0322453 A1 * | 12/2012 | Weng | .................... | H04W 72/02 |
| | | | | 455/450 |
| 2013/0090127 A1 | 4/2013 | Nishikawa et al. | | |
| 2013/0294268 A1 | 11/2013 | Xu et al. | | |
| 2013/0315183 A1 | 11/2013 | Xiang et al. | | |
| 2014/0036786 A1 * | 2/2014 | Kazmi | ................ | H04W 52/247 |
| | | | | 370/329 |
| 2014/0328309 A1 * | 11/2014 | Comstock | ........... | H04W 72/541 |
| | | | | 370/329 |
| 2015/0016291 A1 | 1/2015 | Kim et al. | | |
| 2015/0105092 A1 | 4/2015 | Gaal et al. | | |
| 2015/0111592 A1 | 4/2015 | Chang et al. | | |
| 2015/0341814 A1 | 11/2015 | Yu et al. | | |
| 2016/0285602 A1 | 9/2016 | Fang | | |
| 2018/0123625 A1 | 5/2018 | Lee et al. | | |
| 2020/0137715 A1 * | 4/2020 | Edge | ......................... | G01S 5/10 |
| 2024/0244580 A1 * | 7/2024 | Edge | ......................... | G01S 5/10 |

FOREIGN PATENT DOCUMENTS

| | | |
|---|---|---|
| KR | 10-2009-0097799 A | 9/2009 |
| KR | 10-2014-0006270 A | 1/2014 |
| KR | 1020140057120 A | 5/2014 |
| KR | 1020150009045 A | 1/2015 |
| KR | 1020160121165 A | 10/2016 |
| KR | 10-2016-0132595 A | 11/2016 |
| WO | 2018/067380 A1 | 4/2018 |
| WO | 2018/094989 A1 | 5/2018 |

* cited by examiner

METHOD AND DEVICE FOR CONTROLLING UPLINK INTERFERENCE OF TERMINAL INFORMATION-COLLECTING DEVICE IN WIRELESS COMMUNICATION SYSTEM

CROSS REFERENCE TO RELATED APPLICATIONS

This application is a National Stage of International Application No. PCT/KR2019/010591 filed Aug. 20, 2019, claiming priority based on Korean Patent Application No. 10-2018-0096679 filed Aug. 20, 2018, Korean Patent Application No. 10-2018-0114866 filed Sep. 27, 2018 and Korean Patent Application No. 10-2019-0101424 filed Aug. 19, 2019, the entire contents of which are incorporated herein by reference.

TECHNICAL FIELD

The present disclosure relates to methods and devices for acquiring location information of a terminal by using wireless communication systems.

BACKGROUND ART

Recently, for public services, third parties, not communication service providers, have attempted to acquire a location or movement information of terminals placed in a specific area. As an example, public organizations of the Korea Expressway Corporation and the Korea National Police Agency have attempted to acquire information such as the number or speed of terminals passing through a specific area.

In such a situation, a solution for allowing a third party other than a communication service provider to acquire information on a location or traffic of terminals placed in a specific area for the purpose of public service has not been provided yet. In particular, there is a substantial limitation of requiring techniques for acquiring such information to be implemented without affecting communication equipment and communication networks which have been already installed. Further, there exists a need for many organizations including communication service providers to estimate a location of terminals more accurately. In particular, it is desirable to accurately measure a location of a terminal for various purposes such as emergency rescue, location-based services, and the like.

DETAILED DESCRIPTION OF THE INVENTION

Technical Problem

Embodiments described herein relate to improving the detection of a target terminal and the accuracy of a signal measurement by controlling interference in uplink, in providing devices and methods for acquiring resource assignment information of the uplink, determining an uplink signal based on this, and measuring a location of the target terminal.

Technical Solution

To address the above issues, in accordance with one aspect of the present disclosure, a signal measurement device is provided that includes an information acquisition unit that acquires at least one of an uplink signal from a target terminal or identification information of at least one terminal that may be a source causing interference (i.e. an interference source) to the transmission of the uplink signal, a communication unit that communicates with a base station or a location measurement server, and a controller that generates, based on the uplink signal, interference occurrence information in the uplink signal from the target terminal, or generates interference source information including identification information of the at least one terminal that may be the interference source. In this case, the communication unit can transmit at least one of the interference occurrence information or the interference source information to the base station or the location measurement server.

In accordance with another aspect of the present disclosure, a base station is provided that includes a receiver that receives, from a signal measurement device or a location measurement server, at least one of interference occurrence information in an uplink signal from a target terminal or identification information of at least one terminal that may be an interference source in the uplink signal, and a controller that adjusts, based on information on the interference occurrence information or the identification information of the at least one terminal that may be the interference source, uplink resource assignment of one or more terminals that cause interference, or that may be the interference source, in the uplink signal from the target terminal.

In accordance with further another aspect of the present disclosure, a signal measurement method is provided, the method including an information acquisition step of acquiring at least one of an uplink signal from a target terminal or identification information of at least one terminal that may be an interference source to the transmission of the uplink signal, a generation step of generating, based on the uplink signal, interference occurrence information in the uplink signal from the target terminal, or generating interference source information including identification information of the at least one terminal that may be the interference source, and a transmission step of transmitting at least one of the interference occurrence information or the interference source information to a base station or a location measurement server.

In accordance with yet another aspect of the present disclosure, an interference control method is provided, the method including receiving, from a signal measurement device or a location measurement server, at least one of interference occurrence information in an uplink signal from a target terminal or identification information of at least one terminal that may be an interference source in the uplink signal, and adjusting, based on information on the interference occurrence information or the identification information of the at least one terminal that may be the interference source, uplink resource assignment of one or more terminals that cause interference, or that may be the interference source, in the uplink signal from the target terminal.

Effects of the Invention

In accordance with aspects of the present disclosure, it is possible to improve the performance of detecting and/or measuring an uplink signal from a target terminal by collecting the presence or absence of a terminal and location information of the terminal without affecting to existing communication networks, and reducing interference in uplink using the collected information.

Further, in accordance with aspects of the present disclosure, a user of a device according to embodiments described herein can freely perform communication in the same manner without affecting to the performance of detecting and measuring a target terminal.

Further, in accordance with aspects of the present disclosure, it is possible to improve the performance of detecting the presence or absence of a target terminal and location information by determining whether one or more other terminals cause interference in an uplink signal from the target terminal, and adjusting an uplink resource assignment for at least one of the target terminal or one or more other terminals.

Further, in accordance with aspects of the present disclosure, it is possible to prevent interference from occurring in advance, by acquiring identification information of one or more other terminals that may act as interference sources, and configuring radio resource assignment for a target terminal to be different from radio resource assignment for one or more other terminals.

BEST MODE FOR CARRYING OUT THE INVENTION

Figure 1:
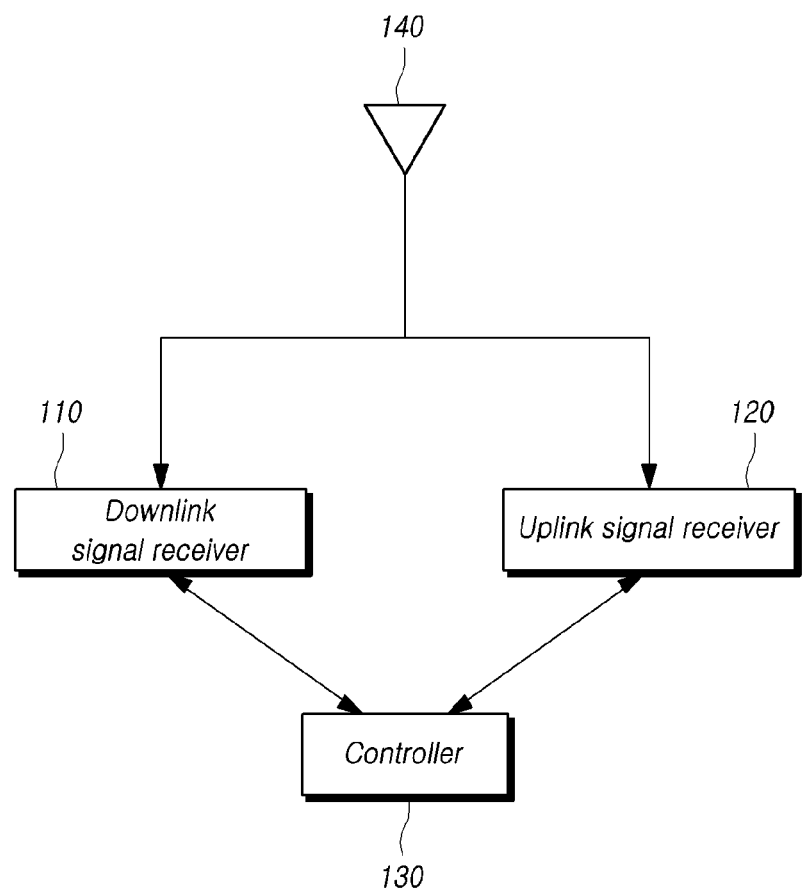
FIG. 1 illustrates a signal measurement device according to one aspect of the present disclosure.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, detailed discussions on known functions and configurations incorporated herein may be omitted when it is needed to focus on the subject matter of the present disclosure.

In the present disclosure, a wireless communication system denotes a system for providing various communication services such as a voice communication service, a packet data service, etc. The wireless communication system includes a terminal (includes a user device or a user equipment (UE)) and a base station (BS).

The terminal is a generic term referring to devices used in wireless communication. For example, the terminal may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally denotes a station communicating with the terminal. The base station or cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of these various cells is controlled by a base station. Therefore, the base station may be classified into two types. 1) One type of the base station may denote an apparatus providing a megacell, a macrocell, a microcell, a picocell, a femtocell, or a small cell that forms a communication service area. 2) The other type of the base station may denote the communication service area. Apparatuses that form and provide a certain radio area, and that are controlled by one or more identical entities or that interact with one another for enabling two or more entities to cooperate with one another to provide the radio area may be referred to as the type 1) base station. According to a scheme of forming and providing a communication service area, a point, a transmission/reception point, a transmission point, a reception point, or the like is an example of this type of base station. A communication service area itself to which a terminal or a neighboring base station transmits a signal or from which the terminal or the neighboring base station receives a signal may be denoted as the type 2) base station.

In the present disclosure, the cell may denote a coverage of a signal transmitted from a transmission/reception point, a component carrier having a coverage of a signal transmitted from a transmission point or a transmission/reception point, or a transmission/reception point itself.

The terminal and the base station herein are entities for performing two types of transmissions or receptions (uplink and downlink) used to embody embodiments, examples, technologies, or technical ideas described in the present disclosure. Thus, the terminal and the base station herein include all entities capable of performing such operations and are not limited to specific terms or words.

Herein, the uplink (UL or a reverse direction) denotes a scheme of data transmission/reception by a UE to/from a base station, and the downlink (DL, or a forward direction) denotes a scheme of data transmission/reception by a base station to/from a UE.

An uplink transmission and a downlink transmission may be performed using a time division duplex (TDD) technique in which a transmission can be performed at a time different from another transmission, a frequency division duplex (FDD) technique in which a transmission can be performed at a frequency different from another transmission, or a hybrid technique of the frequency division duplex (FDD) and the time division duplex (TDD).

Further, in a standard for a wireless communication system, uplink and downlink are configured based on a single carrier or a pair of carriers.

Control information is transmitted in the uplink and/or the downlink configured with a control channel, such as a physical downlink control channel (PDCCH), a physical uplink control channel (PUCCH), and the like, and Data are transmitted in the uplink and/or the downlink configured with a data channel, such as a physical downlink shared channel (PDSCH), a physical uplink shared channel (PUSCH), and the like.

The downlink may denote communication or a communication path from multiple transmission/reception points to a terminal, and the uplink may denote communication or a communication path from the terminal to the multiple transmission/reception points. In the downlink, a transmitter may be a part of multiple transmission/reception points, and a receiver may be a part of a terminal. In the uplink, a transmitter may be a part of a terminal and a receiver may be a part of multiple transmission/reception points.

Hereinafter, a situation where a signal is transmitted or received through a channel such as the PUCCH, the PUSCH, the PDCCH, or the PDSCH, may be expressed as the transmission or reception of the PUCCH, the PUSCH, the PDCCH, or the PDSCH.

Meanwhile, higher layer signaling herein includes radio resource control (RRC) signaling transmitting RRC information containing an RRC parameter.

A base station performs a downlink transmission to terminals. The base station may transmit a physical downlink control channel for transmitting i) downlink control information, such as scheduling required to receive a downlink data channel that is a primary physical channel for a unicast transmission, and ii) scheduling approval information for a transmission through an uplink data channel. Hereinafter, transmitting/receiving a signal through each channel may be described in such a manner that a corresponding channel is transmitted/received. A base station can transmit resource assignment information to a terminal through a PDCCH. Further, the base station can transmit a control signal for resource assignment and signal transmission to the terminal through a PDSCH as well.

Any of multiple access techniques applied to wireless communication systems may be applicable to a wireless communication system of the present disclosure. For example, the wireless communication system may employ various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments or examples described in the present disclosure may be applicable to resource assignment in both an asynchronous wireless communication evolving into LTE/LTE-advanced and IMT-2020 from GSM, WCDMA, and HSPA, and a synchronous wireless communication evolving into code division multiple access, CDMA-2000, and UMB.

In the present disclosure, a machine type communication (MTC) terminal may denote a terminal supporting low costs (or low complexity), a terminal supporting coverage enhancement, or the like. As another example, the MTC terminal may denote a terminal defined as a predetermined category for supporting low cost (or low complexity) and/or coverage enhancement.

In other words, the MTC terminal herein may denote a low cost (or low complexity) user equipment category/type newly defined in 3GPP Release-13 and performing LTE-based MTC-related operations. The MTC terminal may denote a user equipment category/type defined in or before 3GPP Release-12, which supports enhanced coverage in comparison with the typical LTE coverage or supports low power consumption. The MTC terminal may also denote a low cost (or low complexity) user equipment category/type newly defined in Release-13. The MTC terminal may denote a further enhanced MTC terminal defined in Release-14.

In the present disclosure, a NarrowBand Internet of Things (NB-IoT) terminal denotes a terminal supporting radio access for cellular IoT. NB-IoT technology has been developed to provide improved indoor coverage, support for large-scale low-speed terminals, low latency sensitivity, very low terminal costs, low power consumption, and optimized network architecture.

An enhanced mobile broadband (eMBB), massive machine-type communication (mMTC), and ultra-reliable and low latency communication (URLLC) are proposed as representative usage scenarios for NR having been discussed in the 3GPP recently.

In the present disclosure, a frequency, a frame, a subframe, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

Meanwhile, a signal measurement device according to aspects of the present disclosure may be used to measure a signal transmitted by a target terminal, and based on this, determine the presence or absence of the target terminal or a location of the target terminal. The presence or absence of the target terminal may denote whether the target terminal is present in the vicinity of the signal measurement device. The signal measurement device herein may be also referred to as a location measurement device, a position finder, and the like; thus, these devices may be referred to as devices having substantial equal or similar functionality.

For public services, third parties, not communication service providers, have increasingly attempted to acquire location or movement information of terminals present in a specific area. For example, public organizations such as the Korea Expressway Corporation and the Korea National Police Agency have attempted to collect information on the number or speed etc. of terminals passing through a specific area for the purpose of public services. However, techniques for allowing a third party other than a communication service provider to acquire information on the number, a location, or traffic etc. of terminals placed in a specific area for the purpose of public services have not been provided yet. In particular, such an implementation is required to be performed while not substantially affecting to existing communication equipment or communication networks, and to do this, there exist a need for a system capable of accurately estimating information on the terminal.

To address these issues, Korea patent application No. 10-2018-0054836 describes a device for measuring a signal from a target terminal. More specifically, this patent application describes that the signal measurement device includes one or more downlink signal receivers, one or more uplink signal receivers, and a controller, and configures uplink resource assignment information based on control information received by the downlink signal receiver, and determines whether an uplink signal is received based on the uplink resource assignment information. Further, Korea patent application No. 10-2018-0046139 describes features, devices and methods for acquiring location information of a specific target terminal using the device described in Korea patent application No. 10-2018-0054836.

These devices receive downlink signals of mobile communication systems for acquiring corresponding uplink resource assignment information. Thereafter, these devices detect uplink signals based on the uplink resource assignment information, and determine whether a target terminal is present in the vicinity of the signal measurement devices. However, in this case, if another communication device is operating in the vicinity of such a signal measurement device, this communication device may act as a primary interference source in the signal measurement device. Thus, the communication device may cause interference in the signal measurement device detecting a location of the target terminal or degrade a performance of the signal measurement device for detecting a location of the target terminal.

A signal measurement device described herein can search a location of a target terminal while being carried by a person or various moving objects. In this regard, in general, there is a high probability that a user operating such a signal measurement device carries one or more other communication terminals. That is, there is a high probability that the user operating the signal measurement device carries a mobile phone or a portable terminal while measuring a location of a target terminal using the signal measurement device. In another situation, one or more users using any other terminals may accompany, or be placed around, the searcher. In this case, the signal measurement device may encounter great interference caused by one or more signals related to mobile phones or portable terminals of users. Such interference in the signal measurement device may become greater in case of measuring a location of a target terminal using multiple signal measurement devices. In particular, when mobile phones or portable terminals of users use the same communication system as the signal measurement device, the probability of interference may become very high. For example, there may be a situation where a target terminal performs communication using the LTE system, and a mobile phone or portable terminal of a user carrying a signal measurement device measuring a signal from the target terminal also performs communication using the LTE system. At this time, the device may not normally operate due to interference from a signal related to the LTE-based mobile phones or portable terminals being used by the user carrying the signal measurement device.

To address this issue, in accordance with one aspect of the present disclosure, a signal measurement device is provided that acquires uplink resource assignment information of a target terminal, monitors an uplink signal based on this, and when it is determined that a signal related to one or more terminals other than the target terminal causes interference in the uplink signal of the target terminal, provides the interference occurrence information to a base station or a location measurement server so that the base station can adjust a resource assignment for the terminal causing the interference. Further, a method is provided for reducing interference in a signal measurement device, by i) allowing the signal measurement device or a location measurement server to transmit identification information of at least one terminal that may be an interference source to a mobile communication base station, and ii) enabling the base station to configure, based on this, a frequency used by the terminal having the identification information to be different from a frequency used by the target terminal. Such identification information may be one of a phone number, an IMSI, a TMSI, or a serial number at the time of manufacture, of the terminal. Further, any other types of identification numbers that can designate a terminal are also available.

In one example, the terminal that may be an interference source may be a mobile communication terminal used by a searcher carrying the signal measurement device or a terminal connected to the signal measurement device. In another example, the terminal that may an interference source may be one or more terminals used by other searchers accompanying the searcher or by other users around the signal measurement device. The searcher can transmit identification information of the signal measurement device to a mobile communication network or a location measurement server, for example, by inputting the identification information of the signal measurement device through an input unit of the device, At this time, the transmitted information may include the identification information of the signal measurement device and identification information of the terminal that may be an interference source. In one embodiment, the identification information of the terminal that may be an interference source may encompass service provider information, and a phone number, of the terminal. The information on the terminal that may be an interference source may be information on a terminal that may be an interference source for each signal measurement device.

The location measurement server can receive information on one or more terminals, which may be interference sources, transmitted by each signal measurement device. After listing all of one or more signal measurement devices searching one target terminal, the location measurement server can transmit, to the mobile communication network, the information on one or more terminals, which may be interference sources, transmitted by each signal measurement device. At this time, both the identification information of the target terminal and identification information of the terminals that may be interference sources to the target terminal may be included in the transmitted information. A task ID assigned in a positioning system capable of identifying the target terminal, a phone number of the target terminal, and the like may be used as the identification information of the target terminal. In this manner, all information on interference sources for one or more signal measurement devices searching one target terminal may be transmitted to the mobile communication network to minimize interference caused by the interference sources. That is, the location measurement server can perform operation of converting information on the interference sources (or the terminals that may be interference sources) for each signal measurement device, which are transmitted by each signal measurement device, into information on interference sources (or terminals that may be interference sources) for each target terminal. In the above process, the location measurement server can identify information on a service provider of the target terminal, transmit some selected information, for example, only information on terminals that are subscribed to this service provider and that may be interference sources, to the associated mobile communication network.

A time point at which the location measurement server transmits the information on the terminals that may be interference sources may be set to become a time prior to progress of a call establishment, or an uplink signal configuration, for searching the target terminal. Accordingly, the base station of the mobile communication network can adjust resource assignment in advance so that the terminals that may be interference sources cannot cause interference. Further, while the search is performed, there may be a probability that another signal measurement device may be added, or a terminal that may be a new interference source may be appear around the signal measurement device, therefore, such information on the interference sources can be updated at any time. This may be performed such that a searcher additionally inputs information on a terminal that may cause interference in the signal measurement device while the search is performed, and the signal measurement device transmits this information to the location measurement server or the mobile communication network. Further, the location measurement server may subsequently transmit information on the interference sources received from the signal measurement device to the mobile communication network.

Figure 16:
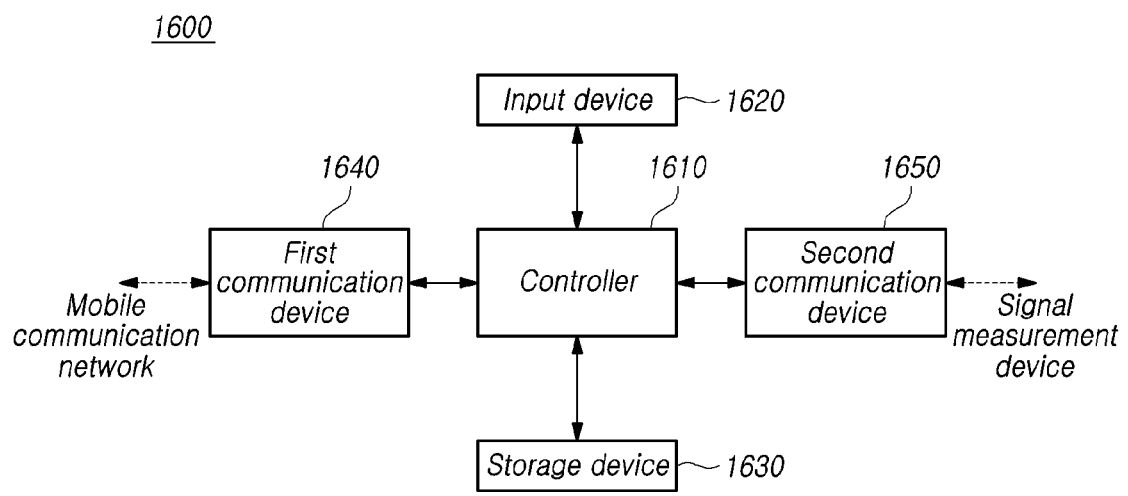
FIG. 16 illustrates a location measurement server according to one aspect of the present disclosure.

FIG. 16 illustrates an example of a location measurement server for performing embodiments described herein in accordance with one aspect of the present disclosure.

Referring to FIG. 16, a location measurement server 1600 can include a controller 1610 for controlling overall operation of the location measurement server, an input device 1620 for receiving an input, such as a command, data, and the like, from a user, a storage device for storing information used for the location measurement server 1630, a first communication device 1640 for communicating with a mobile communication network, and a second communication device 1640 for communicating with one or more signal measurement devices 1650. The structure of the location measurement server for implementing functionality of location measurement is not limited to elements shown in FIG. 16. Thus, location measurement servers described herein may include elements more, or less, than these elements.

The input device 1620 can receive an input, such as a command, information, and data etc. from an administrator. The location measurement server may further include an output device (not shown), such as a display or screen capable of displaying location information of, or information related to, a target terminal, together with the input device.

The first communication device 1640 and the second communication device 1640 can perform communication with the mobile communication network and the signal measurement devices, respectively. A communication scheme in which the first communication device 1640 communicates with the mobile communication network may be different from a communication scheme in which the second communication device 1640 communicates with the signal measurement devices. In another example, the same communication scheme may be used. Although the separate first and second communication devices 1640 and 1650 are employed in FIG. 16, embodiments described herein are not limited thereto. For example, a single device or two or more first and/or second communication devices may be used according to used communication schemes.

The storage device 1630 may store information on one or more registered signal measurement devices or signal collection devices, and information on interference sources (and/or terminals that may be interference sources) connected to the signal measurement devices or signal collection devices. The storage device 1630 may store an identification number of a terminal connected to the signal measurement device and/or an identification number of the signal measurement device. Further, the storage device 1630 may store information on a terminal, such a mobile terminal or a portable terminal, of a searcher carrying the signal measurement device in advance.

The controller 1610 can control the input device, the output device, the storage device, and the communication device. The controller 1610 can generate new information by combining information input by the administrator through the input device and information received from the signal measurement device, and transmit this to an associated mobile communication network. The information received from the signal measurement device may be information on one or more interference sources for each of one or more signal measurement devices. The controller 1610 can convert the information on one or more interference sources for each signal measurement device into information on interference sources for each target terminal, and transmit this to a base station. In one embodiment, the controller 1610 can transmit, to the base station of the mobile communication network, information on all interference sources and/or terminals that may be interference sources to one or more signal measurement devices measuring a location of one target terminal.

In accordance with aspects of the present disclosure, in a wireless communication system, particularly, a mobile communication system, methods and devices are discussed for acquiring information on which situation a specific terminal is located in.

To do this, embodiments described herein provide a device with a new structure in which both a downlink signal receivers and an uplink signal receivers are included. This new device may include one or more uplink signal receivers, and in this case, each uplink signal receiver may be installed in a physical location different from one another. The downlink signal receiver in such a device, called a signal measurement device, may not be an essential element, and in this case, it should be noted that embodiments described herein may be applicable to any signal measurement device having an uplink signal receiver for measuring a signal from a target terminal.

The device according to embodiments described herein can acquire information on which signal may be transmitted from a terminal to a base station through uplink by analyzing a downlink signal transmitted by the base station. Further, the device can receive an uplink signal through the uplink signal receiver, determine whether corresponding uplink data are transmitted from the terminal to the base station, and identify a location of the terminal based on the received signal or data.

Embodiments or examples described herein are related to a technology for acquiring location information of terminals in wireless communication systems.

Devices and methods in which embodiments described herein are applicable may be used for services of providing accurate location information of terminals using mobile communication systems, as well as services of providing traffic information and public services through the wireless communication systems.

Embodiments and examples described herein are expected to be applied in various fields, such as a service of providing a location of a terminal, road control, traffic control, a location information service, and security.

A related technology that is closely associated with the embodiments or examples described herein is mobile communication systems.

Hereinafter, embodiments and examples of the present disclosure will be discussed in detail with reference to accompanying drawings. Further, in describing embodiments and examples of the present disclosure, detailed discussions on known functions and configurations incorporated herein may be omitted when it is needed to focus on the subject matter of the present disclosure. The terms described below are terms defined considering embodiments, examples, and technical ideas in the present disclosure, and may be differently expressed according to intentions or customs of a user, an operator, or the like. Thus, such definition should be interpreted in line with the context of the present disclosure.

Meanwhile, each of embodiments or examples described below may be applicable individually or in any combination with one or more other embodiments or examples.

FIG. 1 illustrates a signal measurement device according to one aspect of the present disclosure.

Referring to FIG. 1, the signal measurement device includes a downlink signal receiver 110, an uplink signal receiver 120, an antenna 140, and a controller 130. The downlink signal receiver 110 of the signal measurement device can receive uplink resource assignment information transmitted in a wireless communication system, and the uplink signal receiver 120 can receive an uplink signal transmitted from a terminal to a base station. Thus, signal measurement devices according to aspects of the present disclosure can receive both an unlike signal and a downlink signal, unlike a normal mobile communication terminal or a base station. The controller 130 can process the received uplink signal or downlink signal. In one embodiment, the signal measurement device can acquire uplink resource assignment information by processing control information received through the downlink signal receiver 110, determine whether one or more terminals that may transmit a signal using the uplink resource are present based on the acquired uplink resource assignment information, when it is determined that a target terminal that may transmit an uplink signal is present, receive the uplink signal through the uplink signal receiver 120, and acquire location information of the target terminal based on an intensity of the received signal. This location information may include whether the terminal is placed in the vicinity of the signal measurement device, and various information, such as, a reception intensity of a signal, a time delay, a reception direction, and the like. In the above process, the signal measurement device shown in FIG. 1 can acquire uplink resource assignment information in various methods. In one embodiment, the signal measurement device can receive uplink resource assignment information from a mobile communication base station using another communication channel. In another embodiment, it is possible to use uplink resources and transmission parameters defined in advance between a mobile communication base station and one or more signal measurement devices according to aspects of the present disclosure.

The structure of FIG. 1 illustrates that uplink and downlink signals can be received via a single antenna 140. Further, the signal measurement device can enable the controller 130 to control the uplink signal receiver 120 and the downlink signal receiver 110 to interoperate with each other.

Although FIG. 1 illustrates that the uplink signal receiver 120 and the downlink signal receiver 110 use the signal antenna 140, embodiments described herein are not limited thereto. For example, the uplink signal receiver 120 and the downlink signal receiver 110 may use respective separate uplink and downlink antennas. In another example, a plurality of uplink antennas and uplink signal receivers may be employed.

Figure 2:
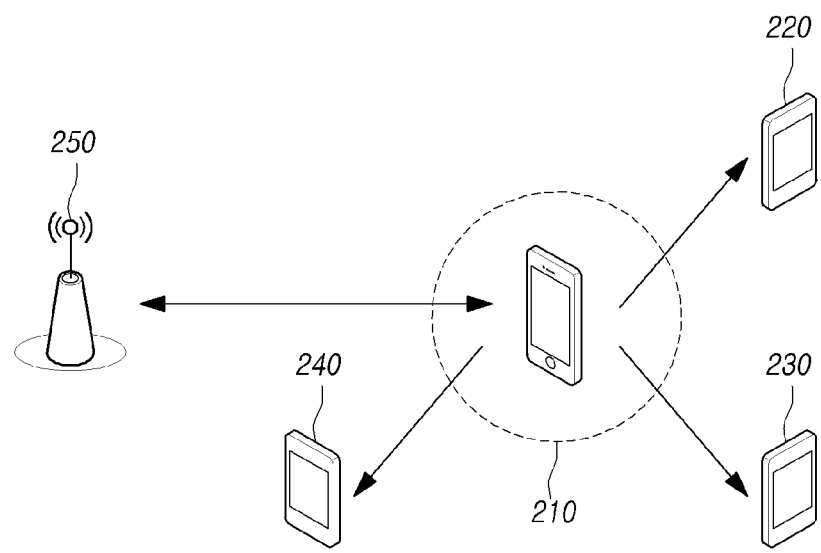
FIG. 2 illustrates a system including a signal measurement device, a base station and a target terminal according to one aspect of the present disclosure.

FIG. 2 illustrates how one or more signal measurement devices, a base station and a target terminal operate for implementing embodiments and examples described herein, according to one aspect of the present disclosure. Referring to FIG. 2, one or more signal measurement devices may be placed in the vicinity of a target terminal whose location is required to be measured. The signal measurement devices can receive a signal transmitted by the target terminal, measure information on an intensity of the received signal, an arrival time delay, a received direction of a signal, and the like, and calculate a location of the target terminal based on the measured information. In one embodiment, the location of the target terminal can be calculated such that each of one or more signal measurement devices transmit information on its respective measurement to a location measurement server, and then the location measurement server calculates the location of the target terminal. The information on the calculated location of the target terminal may be transmitted to each signal measurement device. In another embodiment, the signal measurement devices can share their respective measurements with one another, and then each signal measurement device can measure or determine a location of the target terminal. In the above process, the base station can perform communication with the target terminal by establishing a link with the target terminal. The base station can enable the target terminal to transmit an uplink signal, and transmit uplink resource assignment information to one or more signal measurement devices. In another embodiment, the target terminal may be allowed to transmit an uplink signal using a resource and a time defined in advance between a mobile communication base station and a signal measurement device according to aspects of the present disclosure. In this case, the base station can provide information on whether an uplink signal configuration of the target terminal is performed or released to the signal measurement device or a location measurement server.

The above signal measurement device may be similar to the signal measurement device shown in FIG. 1, and it should be noted that any of signal measurement devices described herein may be applicable to the signal measurement device of FIG. 2. The embodiment shown in FIG. 2 may be used in various usages for estimating a location of a target terminal.

A signal measurement device according to aspects of the present disclosure can measure an uplink signal transmitted by a target terminal or a downlink signal transmitted by a base station, and based on this, acquire information on the presence or absence of the target terminal, location information, a distance from the signal measurement device, and the like. In this process, the signal measurement device can measure an intensity of a signal transmitted by the target terminal, a time delay, and the like.

Figure 3:
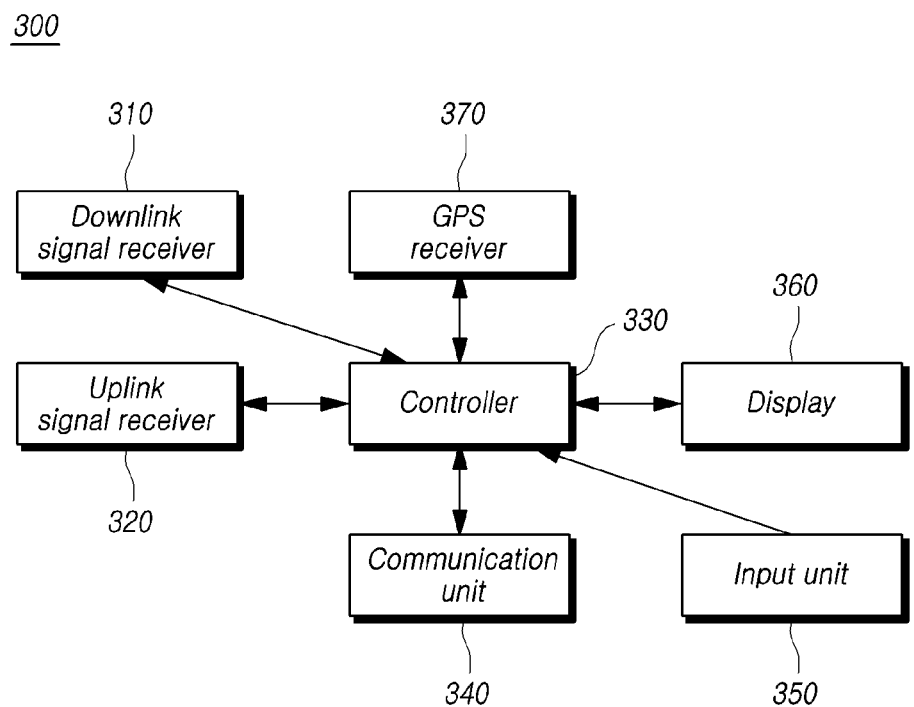
FIG. 3 illustrates a structure of a signal measurement device according to one aspect of the present disclosure.

FIG. 3 illustrates a structure of a signal measurement device 300 for measuring a location of a target terminal according to one aspect of the present disclosure. Referring to FIG. 3, a signal measurement device 300 according to aspects of the present disclosure may include one or more downlink signal receivers 310 and one or more uplink signal receivers 320, for receiving a signal in a mobile communication network. Further, the signal measurement device 300 may include a controller 330 for processing the received signal. Optionally, the signal measurement device 300 may include a communication unit 340 for performing communication with a base station, a location measurement server, or one or more other signal measurement devices, a GPS receiver 370 for acquiring location information of the signal measurement device itself or performing synchronization with an absolute time, an input unit 350 for receiving an input from a user, and a display 360 displaying information processed by the controller 330. In one embodiment, the uplink signal receiver 320 and the input unit 350 may be included in an information acquisition unit (not shown).

Here, the downlink signal receiver 310 and the uplink signal receiver 320 may be an LTE downlink signal receiver and an LTE uplink signal receiver, respectively. Although embodiments and examples described herein are discussed based on the LTE system, however, it should be noted that these embodiments and examples may be easily applied to other types of wireless communication systems. The LTE downlink signal receiver acquires time synchronization to the system by capturing an LTE downlink signal in an initial stage, and obtains an ID of an associated base station, system information, and the like. Further, the downlink signal receiver 310 can receive control information transmitted by the base station to a target terminal. The LTE uplink signal receiver can detect a transmission signal from the target terminal based on information on an uplink transmission resource assigned to the target terminal, and calculate an arrival time of the signal, signal power, and the like.

The signal measurement device 300 shown in FIG. 3 can acquire an absolute time reference, and calculate a difference in respective time points at which each of one or more signal measurement devices receives an uplink signal from the target terminal. In embodiments in relation to FIG. 3, to do this, each signal measurement device can acquire time synchronization based on a GPS signal received by the GPS receiver 370. However, in accordance with aspects of the present disclosure, embodiments described herein are not limited thereto. For example, time synchronization may be acquired between different types of signal measurement devices, or any other methods capable of identifying a difference in time points at which uplink or downlink signals arrive may be used. For example, time synchronization may be acquired by setting a time in advance between signal measurement devices using a high-precision clock, or by any other methods or techniques capable of calculating a relative difference in time. In another example, location measurement may be performed based on a time difference between a time point at which a specific signal is received by the LTE downlink signal receiver and a time point at which an uplink signal related to another user is received. Such reception information of the signal measurement device may be transmitted to a location measurement server. The GPS receiver 370 can also perform a function of measuring a location of the signal measurement device. Such location information of the signal measurement device may be transmitted to the location measurement server, and used for measuring a location of a target terminal.

The signal measurement device 300 may include the communication unit 340, as a separate element, for directly communicating with a location measurement server or a base station, or for directly communicating one or more other signal measurement devices.

The signal measurement device 300 of FIG. 3 may include an output device such as a display for displaying a location of the target terminal to a user. Further, the signal measurement device can include the input unit 350 for receiving an input from a user. It is therefore possible to increase the accuracy of location measurement by allowing the user to manually input additional information such as information on a current location of the signal measurement device through the input unit 350.

The controller 330 of FIG. 3 can control the operation of the signal measurement device. The controller 330 is connected to associated devices, units, or components, and configured to control information reception, measurement, communication, input and output, and the like needed to implement embodiments described herein. The device of FIG. 1 or 3 can acquire uplink resource assignment information by receiving a downlink signal in the mobile communication system. In another embodiment, uplink resource assignment information for a target terminal may be acquired from a base station through another communication channel. In another embodiment, a resource to be assigned to a target terminal may be defined in advance between a base station and a signal measurement device according to aspects of the present disclosure, and thereafter, the pre-defined uplink resource can be used. The signal measurement device can detect an uplink signal based on the uplink resource assignment information, and determine whether a target terminal is present. Meanwhile, if one or more other communication devices are operating in the vicinity of a signal measurement device, these communication devices may act as primary interference sources in the signal measurement device. In this case, the communication devices may cause interference in the signal measurement device detecting the target terminal or degrade a performance of the signal measurement device. The embodiments of FIGS. 1 and 3 illustrate that the signal measurement devices include all of the downlink receiver and the uplink receiver. However, embodiments described herein are not limited thereto. It should be noted that methods of controlling uplink interference according to aspects of the present disclosure may be applicable to signal measurement devices including only at least one uplink receiver without a downlink receiver.

In particular, in case of measuring a location of a target terminal in the system shown in FIG. 2, the location of the target terminal may be measured using multiple devices. In this case, there may be a probability that a user carrying a signal measurement device according to aspects of the present disclosure attempts communication using a terminal operating in the same communication system. For example, there may be a situation where a target terminal performs communication using the LTE system, and a user measuring a signal from the target terminal while carrying the device of FIG. 2 also performs communication using the LTE system. At this time, the device may not normally operate due to a signal related to an LTE terminal of the user carrying the device.

To address this issue, in accordance with one aspect of the present disclosure, a signal measurement device is provided that acquires uplink resource assignment information of a target terminal, monitors an uplink signal based on this, and when it is determined that a signal related to at least one terminal other than the target terminal causes interference in the uplink signal of the target terminal, provides interference occurrence information to a base station or a location measurement server so that the base station can adjust resource assignment for the at least terminal causing the interference.

Specifically, the controller 330 of the signal measurement device 300 acquires uplink resource assignment information of a target terminal, monitors an uplink signal based on the uplink resource assignment information of the target terminal, and when it is determined that at least one terminal causes interference in the uplink signal of the target terminal, generates interference occurrence information for the uplink signal of the target terminal which is required to be transmitted to a base station or a location measurement server using the communication unit 340 so that the base station can adjust resource assignment for the target terminal or the at least one terminal.

In one embodiment, the signal measurement device 300 can receive identification information of the target terminal from the base station. The signal measurement device can determine which control information is transmitted from the base station to the terminal by receiving a forward signal i.e. a downlink signal. Specifically, by processing the received downlink signal using the received identification information of the target terminal, the signal measurement device 300 can derive control information dedicated to the target terminal by the base station, that is, acquire uplink resource assignment information of the target terminal.

Here, the identification information of the target terminal may be a radio network temporary identifier (RNTI) assigned by the base station to the target terminal. In this case, in one embodiment, by receiving control information in connection with an RNTI via a downlink signal receiver, the signal measurement device 300 can determine whether an uplink signal may be transmitted, that is, thereafter, whether the target terminal may transmit the uplink signal to the base station based on the control information.

The term "RNTI" is used as a temporary ID of a terminal in a base station, and since information on which RNTI is assigned to a terminal is not provided, its anonymity can be maintained. Herein, the RNTI is employed for the purposed of identifying a terminal; however, embodiments described herein are not limited thereto. It should be noted that any ID temporarily assigned to a terminal from one base station or cell may be used for the same purpose or function as the RNTI.

That is, instead of measuring location information for arbitrary terminals, a device according to aspects of the present disclosure can receive control information in connection with one or more specific RNTIs for measuring location information of only one or more terminals identified with the one or more specific RNTIs. When the RNTI is used as identification information of a terminal, there is given an advantage of enabling the terminal whose location information is required to be measured at a specific time to be specified without leaking personal information of a user of the terminal (e.g. a phone number, a name, and a serial number).

In the present disclosure, methods are provided for measuring an uplink signal from a target terminal using uplink resource assignment information of the target terminal and transmission parameters based on RNTI information of the target terminal, and based on this, acquiring information on the terminal including the presence or absence of the terminal, a distance from the device according to one aspect of the present disclosure, and a location of the terminal. In one embodiment, to do this, a base station can transmit a downlink control signal to the target terminal. The signal measurement device 300 can receive a downlink signal transmitted by the base station to the target terminal via a downlink signal receiver. In the present disclosure, it is necessary to perform reception and demodulation for a downlink channel in order to receive control information including uplink resource assignment transmitted on downlink. In the present disclosure, methods of receiving downlink control information are discussed. Although some embodiments have been discussed based on a scenario in which a base station provides RNTI information of a target terminal to a signal measurement device according to aspects of the present disclosure, embodiments described herein are not limited thereto. In another embodiment, an RNTI to be used to a target terminal may be defined in advance between a base station and a signal measurement device, and based on this, corresponding operation can be performed substantially equally. However, it should be noted that embodiments and examples described herein may be substantially equally applicable in even a situation in which the signal measurement device 300 does not know an RNTI of a target terminal or desires to acquire location information on unspecified terminals.

A signal measurement device according to aspects of the present disclosure can transmit a unique number of a target terminal whose location is required to be tracked, such as a phone number, to a mobile communication network, in order to request a call establishment between a base station and the target terminal. Such a call establishment may be directly requested by the signal measurement device through communication with the mobile communication network, or it may performed in a manner that the request is transmitted to a location measurement server, and then, the location measurement server communicates with an associated mobile communication system. In another embodiment, the location measurement server may request the mobile communication system to perform a call establishment.

The signal measurement device 300 can detect and measure an uplink signal based on uplink resource assignment information of a target terminal. Information on the presence or absence of the target terminal, a time delay, a signal intensity, and the like may be acquired based on the measured uplink signal. That is, the signal measurement device 300 can monitor an uplink signal using the acquired uplink resource assignment information of the target terminal and transmission parameters. The signal measurement device 300 can acquire the uplink resource assignment information and the transmission parameters by receiving a downlink channel based on a corresponding RNTI. In another embodiment, the uplink resource assignment information and/or the transmission parameters may be received from a base station through another communication channel. Further, it is possible to use uplink resources and transmission parameters defined in advance with the base station.

When other terminals, such as, a portable terminal or mobile phone, being carried by a user using a signal measurement device 300 are present in the vicinity of the signal measurement device 300 and performing communication using the same communication scheme, that is, the same communication system, a signal related to such communication may act as great interference in the signal measurement device. In particular, when other communication devices are close to the signal measurement device 300, the signal measurement device 300 may not normally collect information of a target terminal due to interference, and thus, may not accurately measure a location of the target terminal.

Therefore, uplink resource assignment information of other terminals and a target terminal may be adjusted based on information on other terminals placed in the vicinity of the signal measurement device, which is received by an input. In one embodiment, a signal measurement device according to aspects of the present disclosure and other terminals (such as communication devices) connected to the signal measurement device may include an input device. Here, other communication devices connected to the signal measurement device may be a mobile communication terminal, a tablet, a smartphone, and the like. A user may input, through the input device, an identification number, such as, a phone number, a serial number, and the like, of one or more terminals that may cause interference in a signal measurement device according to aspects of the present disclosure. When such information is input, the signal measurement device can provide the information on the terminals that may be interference sources to a base station or a mobile communication network. The base station or the mobile communication network having received the information on the terminals can change respective frequency bands of the terminals that may cause interference to frequency bands different from a frequency band used by a target terminal; thus, the resulting communication channels may be established. The signal measurement device can directly provide the information on the terminals that may be interference sources to the base station; however, embodiments described herein are not limited thereto. For example, this information may be transmitted to a location measurement server, and then, the location measurement server can transfer the information to the base station.

In the above process, discussions have been conducted on a situation where the information on the terminals that may be interference sources is input to the signal measurement device. However, embodiments described herein are not limited thereto. In one embodiment, an administrator or operator may input the information on the terminals that may be interference sources to the location measurement server, and the location measurement server may transfer this to the mobile communication base station. The location measurement server may include an input device and a communication device. In this case, an operator may input the information to the location measurement server through the input device, and the location measurement server may serve to provide this to the mobile communication base station. In the present disclosure, information on an interference source may be information on, related to, or assigned by, a service provider, to which a terminal being the interference source is subscribed, and a phone number. For example, such information may be an IMSI, a TMSI, a serial number at the time of manufacture, or the like of the terminal. The mobile communication base station receiving the information on the interference sources may configure respective frequency bands used by the interference sources to be different from a frequency band of a target terminal. Such interference sources may be one or more mobile terminals used by a searcher and/or assistants, and one or more terminals performing a communication role by being connected with a signal measurement device according to aspects of the present disclosure.

In the above process, the location measurement server can transmit, to the mobile communication network, not only identification information of one or more terminals that are input or stored in the location measurement server and that may be interference sources, but one or more terminals that may be interference sources and that are received from one or more signal measurement devices. In this manner, it is possible to input information on one or more terminals that may be interference sources in a target terminal through not only the location measurement server, but one or more signal measurement devices.

FIG. 16 illustrates the structure of the location measurement server according to one aspect of the present disclosure. The location measurement server may include the input device through which an administrator can input information, and the output device such as a display or screen for displaying location information of a target terminal and related information. Further, the location measurement server may include the communication device for communicating with one or more signal measurement devices and an associated mobile communication network. The communication device may use different communication schemes or communication systems for communicating with the signal measurement device and communicating with the mobile communication network. Alternatively, the communication device may use the same communication scheme or communication system. The location measurement server may include the storage device for storing a registered signal measurement device or signal collection device and information on a device or terminal that may be an interference source and that is connected to the registered signal measurement device or signal collection device. An identification number of the signal measurement device or a terminal connected to the signal measurement device may be stored in the storage device in advance. Information on a terminal of a searcher carrying the signal measurement device may be stored in the storage device in advance.

The location measurement server may include the controller with capabilities and/or functions of controlling the input device, the output device, the storage device, and the communication device. The controller can generate new information by combining information input by an administrator through the input device and information received from the signal measurement device, and transmit the generated information to the mobile communication network. The information received from the signal measurement device may be information on one or more interference sources for each of one or more signal measurement devices. The location measurement server can convert the information on one or more interference sources for each signal measurement device into information on one or more interference sources for each target terminal, and transmit information resulting from the conversion to an associated base station. In one embodiment, information on one or more terminals that are interference sources, and/or one or more terminals that may be interference sources, in one or more signal measurement devices measuring a location of one target terminal may be transmitted to the base station.

As the base station of the mobile communication network does not assign a frequency used by a target terminal to one or more terminals that may be interference sources, it is possible to avoid causing interference. In one embodiment, when a frequency (or a frequency band) used by the target terminal is f1, a frequency (or a frequency band) to be used by an interference source may be set to f2. Here, f1 and f2 are different frequencies. In another embodiment, f1 and f2 may be configured to be in different frequency bands. As another embodiment for assigning different frequencies in this manner, a target terminal and an interference source may be configured to use different communication schemes or communication systems. For example, a target terminal may transmit a signal using the LTE communication scheme and one or more terminals that may be interference sources may be configured to perform communication using the W-CDMA scheme. Thus, as information on probable interference sources for each signal measurement device or for each location measurement server is registered in advance in the signal measurement device or the location measurement server, and transmitted to an associated mobile communication network, it is possible to enable interference in an uplink signal transmitted by a target terminal to be minimized. In another embodiment, a base station may assign resources for one or more terminals that are interference sources and/or may be interference sources to be different from a resource for a target terminal.

After the base station configures respective frequencies for one or more terminals that are interference sources and/or may be interference sources to be different from that for the target terminal, the base station can transmit information related to this to the location measurement server. In the above process, information on a frequency assigned to the target terminal and information on respective frequencies of one or more terminals that are interference sources and/or may be interference sources may be transmitted to the location measurement server. The location measurement server can display the frequency configuration information on a display or screen.

A signal measurement device according to aspects of the present disclosure can collect uplink resource assignment information of a target terminal and based on this, detect and/or measure an uplink signal from the target terminal. Further, the signal measurement device 300 can not only detect and/or measure the uplink signal of the target terminal, but perform communication for sharing the information with a server or one or more other devices/systems/apparatuses. At this time, the target terminal and the devices/systems/apparatuses for performing such communication may use the same communication scheme/system. In particular, when such communication is performed in the same frequency band as a frequency used by the target terminal, the devices/systems/apparatuses may cause a high level of interference to such an extent that a signal transmitted by the target terminal cannot be normally detected and measured. Further, one or more communication devices, such as a mobile phone or a portable terminal, of a user moving while carrying a signal measurement device according to aspects of the present disclosure, or of other users moving around, may occur a significant level of interference.

When it is determined that at least one other terminal causes, or may cause, interference in an uplink signal of a target terminal, the signal measurement device 300 can transmit interference occurrence information for the uplink signal of the target terminal to a base station or a location measurement server using the communication unit 340. As a result, the base station can recognize or estimate that interference occurs, or may occur, in an uplink signal of the target terminal, and adjust at least one of an uplink resource assigned to the target terminal and uplink recognize assignment or a frequency of the at least one other terminal that causes, or may cause, interference.

In one embodiment, the controller 330 of the signal measurement device 300 can receive uplink signals at an uplink resource assigned to a target terminal via the uplink signal receiver, classify the received uplink signals into an uplink signal related to the target terminal and an interference signal from at least one other terminal, and when an intensity of the interference signal from the at least one other terminal is greater than a predetermined intensity, determine that interference from the at least one other terminal occurs in the uplink signal of the target terminal.

In one embodiment, when it is determined that interference from at least one other terminal occurs in an uplink signal of the target terminal, the controller 330 of the signal measurement device 300 can generate interference occurrence information for the uplink signal of the target terminal so that a base station can change a frequency band of at least one other terminal that may cause interference in a frequency band assigned to the target terminal to a frequency band that does not cause interference in the frequency band assigned to the target terminal. Further, the communication unit 340 can transmit the interference occurrence information for the uplink signal of the target terminal to a base station or a location measurement server. Thus, the base station can configure a frequency (or a frequency band) used by the target terminal to be different from one or more frequencies (or one or more frequency bands) used by a signal measurement device 300 according to aspects of the present disclosure and/or one or more devices used by one or more users in the vicinity of the signal measurement device. In this manner, the signal measurement device 300 can stably detect and measure an uplink signal transmitted by the target terminal. The base station receiving the information can configure the target terminal and the interference source to different uplink frequencies.

In one embodiment, when it is determined that interference from at least one other terminal occurs in an uplink signal of the target terminal, the controller 330 of the signal measurement device 300 can generate interference occurrence information for the uplink signal of the target terminal so that the base station can change an uplink signal transmission time of at least one other terminal that may cause interference at an uplink signal transmission time assigned to the target terminal to a transmission time that does not cause interference at the uplink signal transmission time assigned to the target terminal. The communication unit 340 can transmit the interference occurrence information for the uplink signal of the target terminal to the base station or the location measurement server. The mobile communication base station receiving the information can perform resource assignment such that the target terminal and the at least one interference source transmit respective uplink signals at different times.

In accordance with one aspect of the present disclosure, a method is provided for providing IDs or phone numbers of the communication terminals to a mobile communication network in advance. Through this, the mobile communication network can configure a frequency (or a frequency band) used by a target terminal to be different from a frequency (or a frequency band) of a signal measurement device according to aspects of the present disclose or a terminal of a user in the vicinity of the signal measurement device. As a result, the signal measurement device can stably detect and measure an uplink signal transmitted by the target terminal.

In one embodiment, the signal measurement device 300 may include the input unit 350. The signal measurement device 300 may request its user to input an identification number of at least one other terminal that may cause interference in an uplink signal from the target terminal. The user can input an identification number of at least one other terminal that may cause interference in an uplink signal from the target terminal to the signal measurement device 300 through the input unit 350. Here, the identification number of at least one other terminal may be a phone number or information on a corresponding service provider, or any other information for identifying the at least one other terminal. For example, such an identification number may be information on mobile terminals or portable terminals of a user carrying the signal measurement device 300 or users in the vicinity of the signal measurement device, such as phone numbers or information on one or more corresponding service providers.

In the embodiment of FIG. 3, a signal transmitted by the communication unit 340 may become an interference source in the uplink signal receiver 320 of the signal measurement device. A searcher can input an identification number of the communication unit 340 to the signal measurement device through the input unit 350. In another embodiment, the signal measurement device itself of FIG. 3 can identify an identification number of a terminal or a device, and include the identified number in a list of terminals that may be interference sources. In this situation, the controller 330 can acquire the identification information of the communication unit 340 through a USIM or a storage device of the terminal or the signal measurement device, and include the acquired information in the list of terminals that may be interference sources.

In another embodiment, the identification information of the communication unit 340 may be stored together with an identification number of a signal measurement device in a location measurement server or a mobile communication network, and thereafter, the stored information may be used when needed. In this case, the location measurement server or a base station of the mobile communication network may store identification information of respective communication unit for each signal measurement device in a storage device, and thereafter, the stored information may be used when needed. In this case, respective identification number of each signal measurement device is corresponded to a respective identification number of each communication unit, it is not necessary for one or more users to input one or more respective identification numbers of one or more communication units each time. The mobile communication base station can configure a resource used by a target terminal and a resource used by the communication unit 340 to be different from each other based on the identification information of the communication unit 340. For example, a frequency used by a target terminal and a frequency used by the communication unit 340 may be configured to be different from each other. In another example, resource assignment for the communication unit 340 may be performed so that the communication unit 340 cannot transmit an uplink signal at a time at which a target terminal transmits an uplink signal for location measurement. If multiple signal measurement devices measure a location of one target terminal, resource assignment for respective communication unit 340 of each signal measurement device may be performed so that the respective communication unit 340 cannot transmit an uplink signal at a time at which the target terminal transmits an uplink signal for location measurement.

The signal measurement device 300 can determine whether there is a probability of uplink signal interference between a target terminal and at least one other terminal by monitoring an uplink signal based on identification information of the at least one other terminal, and when it is determined that uplink signal interference has occurred between the target terminal and the at least one other terminal, generate interference source information including the identification information of the at least one other terminal so that an associated base station can change uplink resource assignment information of the at least one other terminal to a resource that does not cause interference in the uplink signal of the target terminal. Further, the communication unit can transmit the interference source information including the identification information of the at least one other terminal to the base station or a location measurement server. The identification information of the at least one other terminal may be a corresponding RNTI. In another example, this may be resource information and/or time information used by the at least one other terminal.

In another embodiment, the signal measurement device 300 receiving, with an input, the information on the at least one other terminal or the communication device that may cause interference can transmit the information to the base station. In this manner, the base station can determine whether at least one other terminal may cause interference in an uplink signal of a target terminal based on identification information of the at least one other terminal, and when it is determined that the at least one other terminal may cause interference in the uplink signal of the target terminal, change uplink resource assignment information of the at least one other terminal to a resource that does not cause interference in the uplink signal of the target terminal. For example, the base station may establish a communication channel using a frequency band different from a first frequency band used by the target terminal. In this instance, the occurrence of additional interference may be prevented by not assigning even one or more adjacent frequency bands to the at least one other terminal. That is, such additional interference may be reduced or prevented using a frequency different, for example, spaced apart, from a frequency adjacent to a frequency used by the target terminal. In another embodiment, a communication link of a terminal that may cause interference in an uplink signal of a target terminal may be established in a frequency band completely different from a frequency band used by the uplink signal of the target terminal. Here, the signal measurement device 300 can transmit information on the terminal that may cause interference to a location measurement server, and communicate with an associated base station through the location measurement server.

In one embodiment, the signal measurement device 300 may include the input unit 350. A user of the signal measurement device 300 can input an identification number of at least one other terminal that may cause uplink interference in the signal measurement device through the input unit 350. Here, the identification number of at least one other terminal may be an RNTI or any other information for identifying the at least one other terminal, such as a phone number, and the like. In another embodiment, the identification number of at least one other terminal may be information on a service provider and a phone number of the at least one other terminal. In another embodiment, the identification number of at least one other terminal may be its serial number. The signal measurement device 300 receiving the identification information of the at least one other terminal with such an input can acquire uplink resource assignment information of a target terminal and uplink resource assignment information of at least one other terminal based on control information received by a downlink signal receiver, identification information of the target terminal, and identification information of the at least one other terminal, compare between the uplink resource assignment information of the target terminal and the uplink resource assignment information of the at least one other terminal, and when it is estimated that an uplink signal from the at least one other terminal may cause interference in an uplink signal of the target terminal, transmit the identification information of the at least one other terminal to the base station or the location measurement server using the communication unit 340 so that the base station can adjust the uplink resource assignment of the at least one other terminal.

The signal measurement device 300 can collect identification information for identifying at least one other terminal through an input by a user. In another embodiment, in a situation where the information on a service provider and a phone number of the at least one other terminal are stored in advance in a storage unit of the signal measurement device, for greater efficiency, the collection of such identification information may be automatically performed when location information of the target terminal is requested. In another embodiment, information on one or more probable interference source terminals for each signal measurement device may be stored in advance in a server, and thereafter, when needed, the stored information may be used. That is, in a situation where the information on one or more probable interference source terminals for each signal measurement device may be stored in advance, when search for a specific target terminal is required and one signal measurement device is used, information on one or more connected interference source terminals may be transmitted to an associated mobile communication network. At this time, the one or more probable interference source terminals for each signal measurement device may be another mobile phone or portable terminal of a searcher carrying the signal measurement device and/or a terminal serving as a communication channel of the signal measurement device.

The base station or the mobile communication network can store identification information of the communication unit 340 of the signal measurement device of FIG. 3. The base station can configure a resource used by a target terminal and a resource used by the communication unit 340 to be different from each other based on the identification information of the communication unit 340. For example, a frequency used by a target terminal and a frequency used by the communication unit 340 may be configured to be different from each other. In another example, resource assignment for the communication unit 340 may be configured not to transmit an uplink signal at a time at which a target terminal transmits an uplink signal for location measurement. If multiple signal measurement devices measure a location of one target terminal, resource assignment for respective communication unit 340 of each signal measurement device may be configured not to transmit an uplink signal at a time at which the target terminal transmits an uplink signal for location measurement.

A signal measurement device according to aspects of the present disclosure can transmit a unique number of a target terminal whose location is required to be tracked, such as a phone number, to a mobile communication network, in order to request a call establishment between a base station and the target terminal. Such a call establishment may be directly requested by the signal measurement device through communication with the mobile communication network, or it may performed in a manner that the request is transmitted to a location measurement server, and then, the location measurement server communicates with an associated mobile communication system.

In some embodiments, a location measurement server may be included in the mobile communication system. The location measurement server can serve to calculate a location of a target terminal based on respective measurement information acquired by each information collection device, such as reception power, a time delay, a location of the information collection device, and the like, and transmit information on the location of the target terminal to each information collection device. The location measurement server according to aspects of the present disclosure can serve to collect information on one or more probable interference source terminals transmitted by each information collection device, and transmit the collected information to an associated mobile communication system. Further, the location measurement server can serve to transmit an RNTI of a target terminal set by the mobile communication system and some information related to resource assignment to one or more signal measurement devices according to aspects of the present disclosure.

When embodiments described herein are used, the complexity of the signal measurement device receiving control information can be reduced, and a performance of the signal measurement device for receiving an uplink signal transmitted to a target terminal can be improved.

Figure 4:
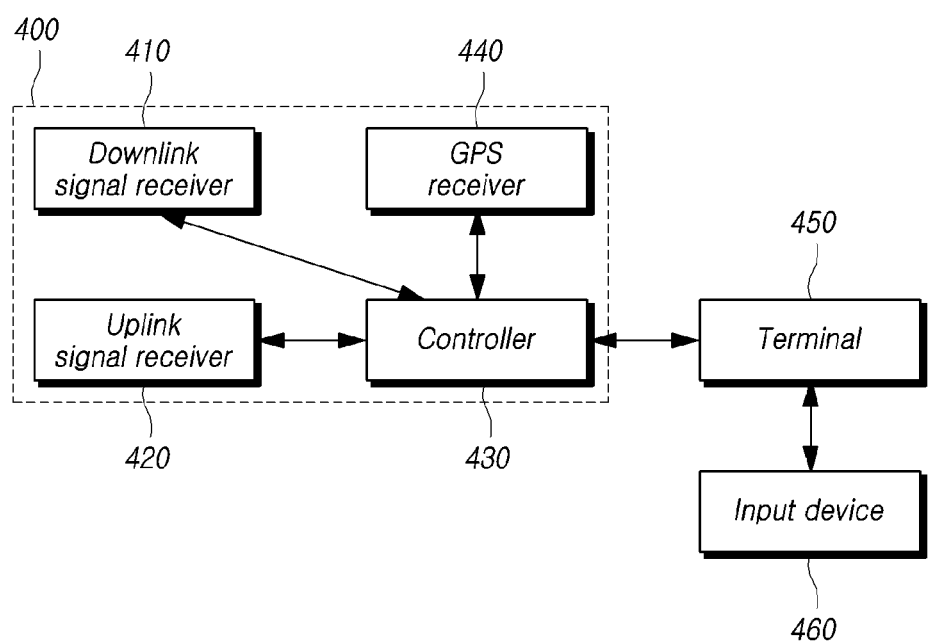
FIG. 4 illustrates a structure of a signal measurement device according to another aspect of the present disclosure.

FIG. 4 shows a configuration of a signal measurement device 400 according to one aspect of the present disclosure. The signal measurement device according to one aspect of the present disclosure or one or more devices connected to the signal measurement device are not limited to the configuration of FIG. 4. That is, various configurations different from the configuration of FIG. 4 may be implemented.

While the signal measurement device shown in FIG. 4 according to one aspect of the present disclosure does not include a communication unit, a display, an input unit, and the like, when functions corresponding to operations of these components are needed, one or more external devices, such as a location measurement server, one or more other signal measurement devices, a smartphone, a tablet, and the like, may be connected to the signal measurement device for implementing such functions wirelessly or in wired connection. When needed, the number of components included in, or connected to, the signal measurement device may be decreased. Referring to FIG. 4. elements in a box indicated by dotted lines represent components included in the signal measurement device 400. In this configuration, the signal measurement device may be used by being connected to a terminal 450, such as a smartphone, a tablet, and the like. Components included in the signal measurement device 400 of FIG. 4 are corresponded to respective components of the signal measurement device 300 of FIG. 3. Therefore, for discussions on the signal measurement device 400 of FIG. 4, reference is made to discussions on the signal measurement device 300 of FIG. 3.

In one embodiment, a communication device connected to the signal measurement device may include an input unit or be connected to an input device. Here, the communication device connected to the signal measurement device may be a typical mobile communication terminal, a tablet, a smartphone, and the like. A user may input, through the input unit or the input device, an identification number of at least one terminal that may cause uplink interference in the signal measurement device. Here, the identification number of the at least one terminal may be an RNTI or any other information for identifying the at least one terminal, such as a phone number, and the like. The signal measurement device receiving such information by the inputting of the user can provide the information on the at least one terminal that may be an interference source to a base station or a location measurement server. In this manner, the base station can determine whether the at least one terminal may cause interference in an uplink signal of a target terminal based on the identification information of the at least one terminal, and when it is determined that the at least one terminal may cause interference in the uplink signal of the target terminal, change uplink resource assignment information of the at least one terminal to a resource that does not cause interference in the uplink signal of the target terminal. For example, the base station may establish a communication channel using a frequency band different from a first frequency band used by the target terminal.

In the configuration of FIG. 4, a signal transmitted by the terminal 450 may become an interference source in an uplink signal receiver 420 of the signal measurement device. A searcher can input an identification number of the terminal 450 to the signal measurement device through an input device 460. In another embodiment, the signal measurement device itself of FIG. 4 can identify the identification number of the terminal 450, and include the identified information in a list of terminals that may be interference sources. In the above process, the terminal 450 can acquire the identification information of the terminal 450 through a USIM or a storage device of the terminal, and include the acquired information in the list of terminals that may be interference sources.

In another embodiment, the identification information of the terminal 450 may be stored together with an identification number of a signal measurement device in a location measurement server or a mobile communication network, and thereafter, the stored information may be used when needed. The mobile communication base station can configure a resource used by a target terminal and a resource used by the terminal 450 to be different from each other based on the identification information of the terminal 450. For example, a frequency used by a target terminal and a frequency used by the terminal 450 may be configured to be different from each other. In another example, resource assignment for the terminal 450 may be configured not to transmit an uplink signal at a time at which a target terminal transmits an uplink signal for location measurement. If multiple signal measurement devices measure a location of one target terminal, resource assignment for respective terminal 450 of each signal measurement device may be configured not to transmit an uplink signal at a time at which the target terminal transmits an uplink signal for location measurement.

In one embodiment, a communication device connected to the signal measurement device may include an input unit or be connected to an input device. Here, the communication device connected to the signal measurement device may be a typical mobile communication terminal, a tablet, a smartphone, and the like. A user may input, through the input unit or the input device, an identification number of at least one terminal that may cause uplink interference in the signal measurement device. Here, the identification information of at least one other terminal may be an RNTI or any other information for identifying the at least one other terminal, such as a phone number, an IMSI, a TMSI, a serial number, and the like. The identification information may include information on a corresponding service provider. The signal measurement device 300 receiving such identification information of the at least one other terminal by an input can acquire uplink resource assignment information of a target terminal and uplink resource assignment information of at least one other terminal based on control information received by a downlink signal receiver, identification information of the target terminal, and identification information of the at least one other terminal, compare between the uplink resource assignment information of the target terminal and the uplink resource assignment information of the at least one other terminal, and when it is estimated that an uplink signal from the at least one other terminal may cause interference in an uplink signal of the target terminal, transmit the identification information of the at least one other terminal to the base station or the location measurement server using the communication unit 340 so that the base station can adjust the uplink resource assignment of the at least one other terminal. It should be noted that such an acquisition of resource assignment information of a target terminal can be performed using one or more other methods descried herein.

Figure 5:
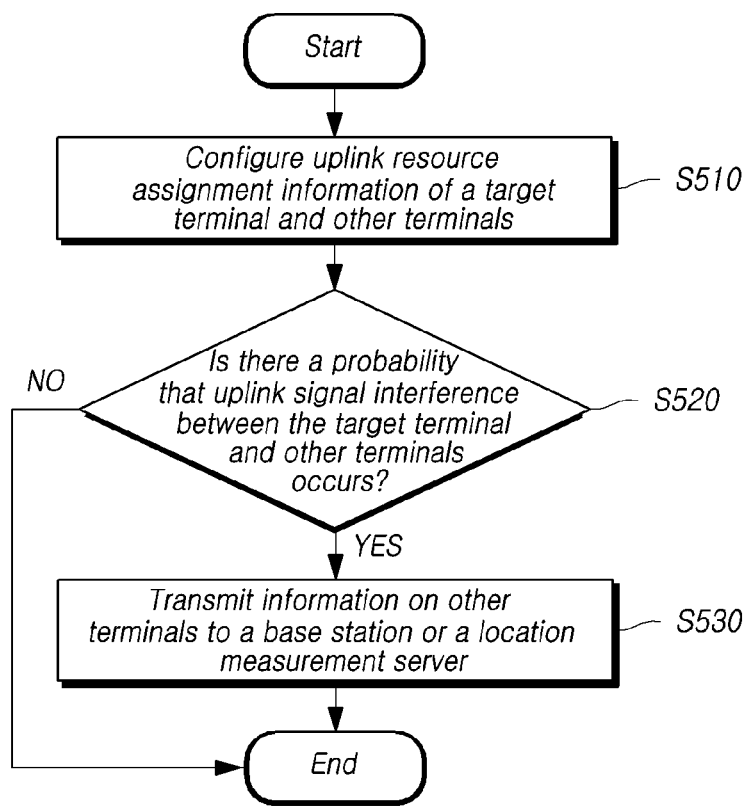
FIG. 5 is a flowchart to show a signal measurement method according to one aspect of the present disclosure.

FIG. 5 is a flowchart to show a signal measurement method according to one aspect of the present disclosure.

A signal measurement device according to aspects of the present disclosure can acquire uplink resource assignment information of a target terminal and at least one other terminal by receiving a downlink signal from a base station, at step S510. In this instance, the signal measurement device can perform parsing for the uplink resource assignment information using identification information of the target terminal and the at least one other terminal which is received from the base station, received through an input unit, or stored in advance. Here, the identification information may be corresponding RNTIs. In another embodiment, the signal measurement device may directly receive the uplink resource assignment information of the target terminal from the base station. In another embodiment, a resource defined in advance between the base station and the signal measurement device may be used.

In one embodiment, an information process device can monitor an uplink signal using the acquired uplink resource assignment information, and determine whether uplink signal interference between the target terminal and the at least one other terminal occurs, at step S520.

In another embodiment, the information process device can determine whether there is a probability of uplink signal interference between the target terminal and the at least one other terminal by analyzing the acquired uplink resource assignment information, at step S520. Specifically, the information process device can determine whether there is a probability of uplink signal interference between the target terminal and the at least one other terminal by comparing between the uplink resource assignment information of the target terminal and the uplink resource assignment information of the target terminal.

When it is determined that there is not a probability of uplink signal interference between the target terminal and the at least one other terminal, the information process device can terminate the instant process of the signal measurement method. However, when it is determined that there is interference, or there is a probability of uplink signal interference, between the target terminal and the at least one other terminal, the information process device can transmit information on the at least one other terminal to a base station or a location measurement server, at step S530. Here, the information on the at least one other terminal may include uplink resource assignment information, identification information, and the like, of the at least one other terminal.

In this instance, the base station can recognize information on the interference probability or interference occurrence between the target terminal and the at least one other terminal. This enables the base station to configure a terminal that may act as an interference source in an uplink frequency or frequency band used by the target terminal to use a different frequency or frequency band therefrom. In one embodiment, the configuration of such a different frequency or frequency band may be performed such that additional interference cannot be caused by not assigning even one or more adjacent frequency bands to the terminal that may act as an interference source. That is, such additional interference may be reduced or prevented using a frequency different, for example, spaced apart, from a frequency adjacent to a frequency used by the target terminal. In another embodiment, a communication link of a terminal that may cause interference in an uplink signal of a target terminal may be established in a frequency band completely different from a frequency band used by the uplink signal of the target terminal.

In some embodiments, a location measurement server may be included in the mobile communication system. The location measurement server can serve to calculate a location of a target terminal based on respective measurement information acquired by each information collection device, such as reception power, a time delay, a reception direction of a signal, a location of the information collection device, and the like, and transmit information on the location of the target terminal to each information collection device. The location measurement server according to aspects of the present disclosure can serve to collect information on one or more probable interference source terminals transmitted by each information collection device, and transmit the collected information to an associated mobile communication system. Further, the location measurement server can serve to transmit an RNTI of a target terminal set by the mobile communication system and some information related to resource assignment to one or more signal measurement devices according to aspects of the present disclosure.

When embodiments described herein are used, the complexity of the signal measurement device receiving control information can be reduced, and a performance of the signal measurement device for receiving an uplink signal transmitted to a target terminal can be improved.

A signal measurement device according to another aspect of the present disclosure can include one or more downlink signal receivers for receiving a downlink signal, one or more uplink signal receivers for receiving an uplink signal, a communication unit for performing communication with a base station or a location measurement server, and a controller for acquiring uplink resource assignment information of a target terminal, acquiring, from the base station or the location measurement server, information on at least one other terminal that may transmit an uplink signal over an uplink resource of the target terminal, and monitoring uplink signals based on the uplink resource assignment information of the target terminal and information on the at least one other terminal.

In this instance, the communication unit can transmit, to the base station or the location measurement server, a request signal for requesting the information on the at least one other terminal that may transmit an uplink signal at the uplink resource of the target terminal. In another example, the communication unit can transmit the information on the at least one other terminal.

A signal measurement device according to further another aspect of the present disclosure can include one or more downlink signal receivers for receiving a downlink signal, one or more uplink signal receivers for receiving an uplink signal, an input unit for receiving identification information of at least one other terminal by an input, a controller for generating interference source information including the identification information of at least one other terminal, and a communication unit for transmitting the interference source information to a base station or a location measurement server.

Figure 6:
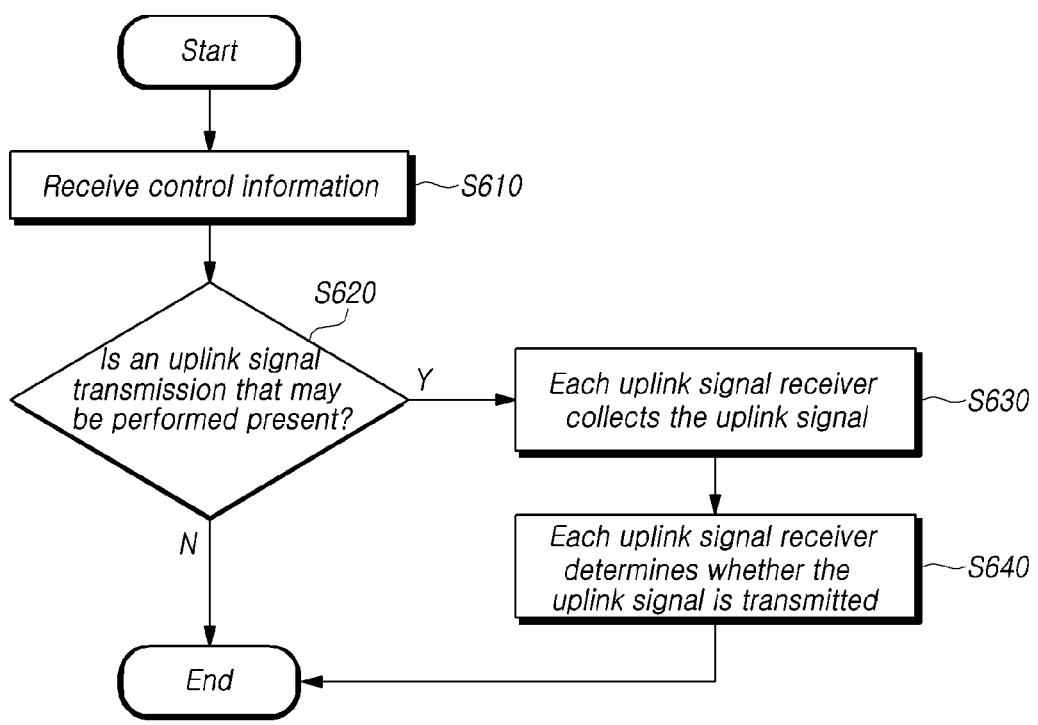
FIG. 6 is a flowchart to show a signal measurement method according to one aspect of the present disclosure.

FIG. 6 is a flowchart to show an operation procedure of a device according to one aspect of the present disclosure.

Referring to FIG. 6, the operation of a communication device based on the LTE system as one example of mobile communication systems is discussed. The LTE system operates based on a TTI of 1 ms, and forward control information may be transmitted from a base station to a terminal at each transmission time interval (TTI). Meanwhile, the procedure discussed below may be equally applicable to even any mobile communication systems other than the LTE system.

The communication device can receive control information transmitted from a base station to a terminal, at step S610.

The terminal can demodulate and decode one or more downlink signals in each TTI. In this situation, the downlink signal received by the terminal from the base station may be a control channel such as a PDCCH or a data channel such as a PDSCH. That is, in the LTE, control information may be normally transmitted through the PDCCH, and when the control information is transmitted through the PDSCH, the PDSCH may be received. In this situation, a device according to aspects of the present disclosure may receive the PDCCH of downlink first, and thereafter, attempt to receive the PDSCH on which the control information is transmitted. A signal measurement device according to aspects of the present disclosure can receive a downlink signal, and based on this, acquire information on a time at which an uplink signal is transmitted.

The communication device can receive a forward signal transmitted from the base station to the terminal, that is, a downlink signal, and thereafter, identify when an uplink may be transmitted and which resource the uplink may be transmitted on, and which RNTI the terminal has at that time. That is, resource assignment information for the uplink and identification information of the terminal such as an RNTI corresponding to this can be acquired via the communication device.

Each uplink signal receiver can check whether an uplink signal that may be transmitted is present for the uplink resource identified in this manner, at step S620. This process may include determining whether a terminal that may transmit uplink is present, and which RNTI the terminal has, through control information transmitted on downlink. That is, when each uplink signal receiver determines that an uplink signal transmission may be performed, each uplink signal receiver can collect the uplink signal transmitted to the base station through the corresponding uplink resource, and based on the collected uplink signal, determine whether the uplink signal is transmitted.

When it is determined that an uplink signal transmission may be performed, at step S620-Y, one or more uplink signal receivers included in the communication device can attempt to receive the uplink signal such that each uplink signal receiver collects the uplink signal, at step S630.

Further, each uplink signal receiver included in the communication device can determine whether the uplink signal is transmitted, at step S640.

On the other hand, when it is determined that an uplink signal transmission may not be performed, at step S620-N, the device waits until next control information is received without performing a separate uplink signal collecting operation.

This operation may be performed continuously in each TTI. Further, the communication device can identify the presence or absence of a terminal, a location of the terminal, and mobility information thereof based on the presence or absence of the uplink signal transmission, which is determined based on the signal collected by each uplink signal receiver.

The above process may be performed based on information on an RNTI of the terminal. That is, the communication device can determine whether an uplink signal transmitted only from a terminal having a specific RNTI is transmitted, and identify the presence or absence of the terminal having the specific RNTI, and a location and mobility information of the terminal.

Figure 7:
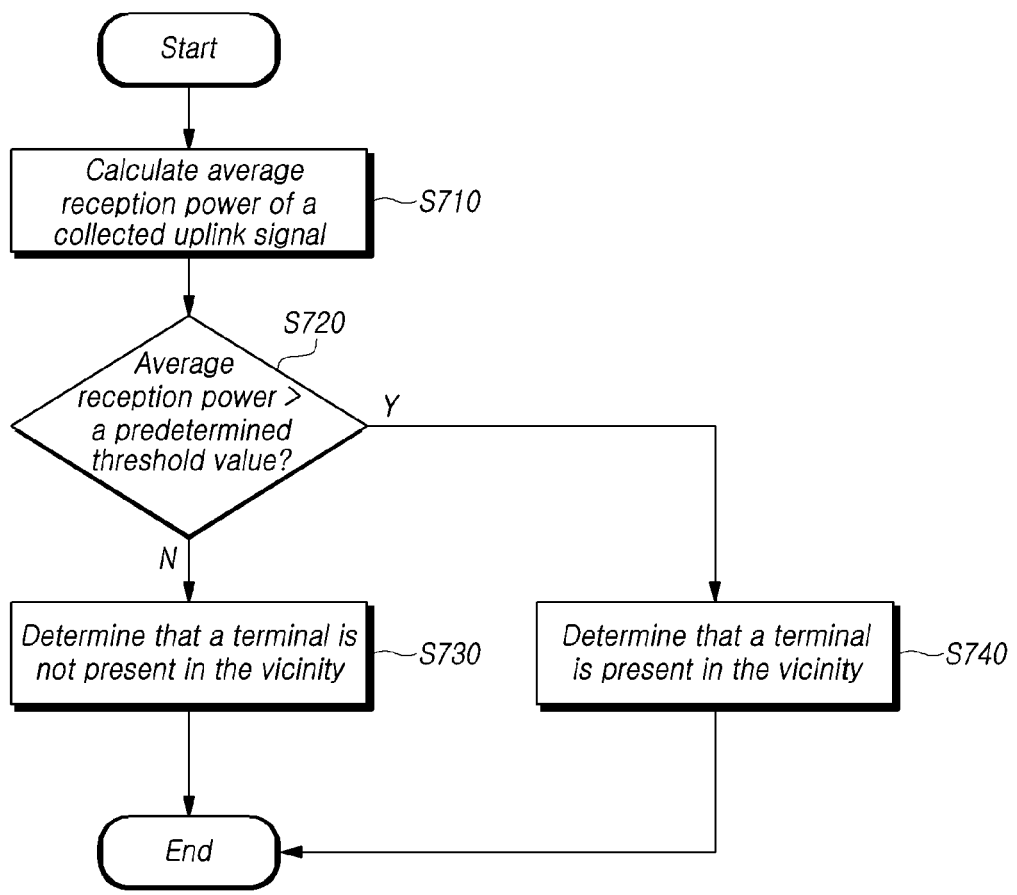
FIG. 7 is a flowchart to show a signal measurement method according to one aspect of the present disclosure.

FIG. 7 is a flowchart to show a method of detecting the presence or absence of an uplink signal according to one aspect of the present disclosure.

Referring to FIG. 7, a communication device can acquire transmission information of uplink based on a downlink signal received via a downlink signal receiver. Based on the acquired uplink transmission information, the communication device can collect an uplink signal transmitted from a terminal to a base station through a resource assigned on the uplink, and calculate average reception power of the collected signal, at step S710.

The communication device can compare a calculated average reception power value with a threshold value calculated or set in advance, at step S720. When the average reception power value is greater than the threshold value through the comparing, at step S720-Y, since the uplink signal has been received, the communication device can determine that that a terminal whose location is required to be measured is present in the vicinity of the device, at step S740. On the other hand, when the average reception power value is smaller than the threshold value, at step S720-N, since the uplink signal is not received, the communication device can determine that a terminal whose location is required to be measured is not present in the vicinity of the device, at step S730.

In the above process, power of a reference signal, which is a pilot signal, transmitted over an uplink PUCCH or PUSCH may be used for calculating a reception power value of uplink. In another embodiment, power of a data signal transmitted over the uplink PUCCH or PUSCH may be used for calculating a reception power value of the uplink. Further, the presence or absence of a terminal and the location information of the terminal can be identified by combining power values of the reference signal and the data signal. In another embodiment, a sounding reference signal transmitted on uplink may be used for calculating a reception power value of the uplink.

In the present disclosure, methods have been provided for detecting and measuring an uplink signal transmitted by the target terminal using one or more signal measurement devices placed in the vicinity of a target terminal, and based on this, controlling interference in the uplink signal in the process of measuring a location of the target terminal. The embodiments described above have been implemented such that information on known interference sources is received by an input, and based on this, a frequency or time different from a frequency or time used by a target terminal is assigned to the interference sources.

However, while a signal measurement device or a location measurement device according to aspects of the present disclosure is operating in actual, there is a probability that one or more unexpected interference sources transmit uplink signals in the vicinity of the signal measurement device or the location measurement device. In this situation, an uplink signal from a target terminal may not be normally detected and/or measured due to interference caused by the interference source. To address this issue, in some embodiments described herein, a signal measurement device according to aspects of the present disclosure is provresent placed in the vicinity of the device, and transmits information on this to a base station. In this process, the signal measurement device may directly provide the information to a mobile communication system. In another example, the signal measurement device may provide the information to a location measurement server, and then, the location measurement server may provide the information to the mobile communication system.

The base station or the mobile communication system according to aspects of the present disclosure can recognize the presence of interference sources reported from the signal measurement device, and change or re-set resources (including a frequency, a code, a time, and the like) used, or to be used, by the interference sources so that the signal measurement device can detect an uplink signal from a target terminal without interference from the interference sources. In the above process, the mobile communication system may change frequencies used by the interference sources or set times used by the interference sources to be different from a time at which an uplink signal from the target terminal is transmitted. That is, by differently configuring a resource, such as a frequency, a time, and the like, used by the target terminal for transmitting the uplink signal and resources, such as a frequency, a time, and the like, used by the interference sources for transmitting an uplink signal, signals from the target terminal can be easily detected and/or measured. Further, when the resource assignment of the interference source is changed, this may be signaled to the signal measurement device for providing the information that the resource assignment has been performed so that interference can be reduced. In one embodiment, the mobile communication system can directly signal the change of the resource assignment to the signal measurement device. In another embodiment, as a method of giving the same effect, the mobile communication system can signal the change of the resource assignment to a location measurement server, and then the location measurement server can signal this to one or more signal measurement devices.

As describe above, when a signal measurement device according to aspects of the present disclosure reports information on a terminal that is, or may be, an interference source to a mobile communication base station, the mobile communication base station can change corresponding resource assignment for the terminal, and thus, interference caused by the terminal may be reduced or prevented. As interference is reduced when the change of the resource assignment is performed, the base station can signal the fact that the change of the resource assignment is completed to the signal measurement device or the location measurement server. The signal measurement device receiving the information on the change of the resource assignment can check whether an amount of interference is reduced, and suspend interference measurement for the corresponding resource or change a current measurement scheme to another measurement scheme. For example, the change of the measurement scheme may include lengthening a period of measurement.

A signal measurement device according to aspects of the present disclosure can detect and detect an interference source that transmits a signal causing great interference on uplink.

Figure 8:
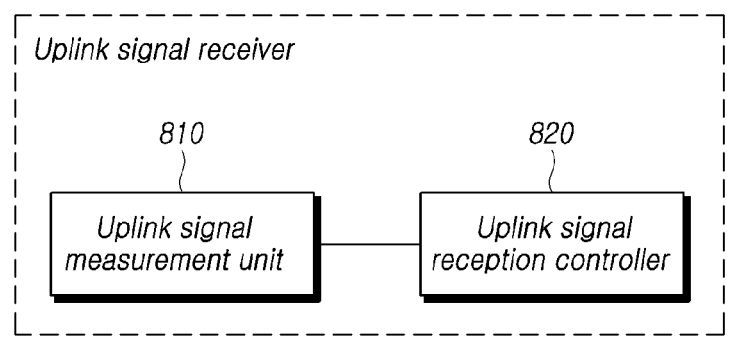
FIG. 8 illustrates a structure of an uplink signal receiver of a signal measurement device according to one aspect of the present disclosure.

FIG. 8 illustrates a structure of an uplink signal receiver of a signal measurement device according to one aspect of the present disclosure. Referring to FIG. 8, the uplink signal receiver of the signal measurement device can include an uplink signal measurement unit 810 and an uplink signal reception controller 820. The uplink signal measurement unit 810 can receive an uplink signal from a target terminal and/or an uplink signal from an interference source. The signal measurement device can measure reception power of an uplink signal from the interference source, and when the reception power of the interference source is greater than a threshold value defined in advance, signal information on the interference source to a base station or a mobile communication system.

The uplink signal measurement unit 810 of FIG. 8 may be differently implemented according to configured systems. In the case of the GSM, such an implementation may be performed by measuring power received over a frequency and a time slot used for transmitting a signal. In particular, an amount of interference and a corresponding interference source may be measured based on midamble power of a frame transmitted in uplink. When the signal measurement device detects interference and/or an interference source, the signal measurement device can transmit, to a mobile communication base station, information on a frequency and a time resource used by the detected interference source. Such a transmission may be directly performed by the signal measurement device to the base station, or performed by the signal measurement device to a location measurement server, and then, the location measurement server can transmit this to the base station.

In the case of the W-CDMA, the above implementation may be performed using a despreader for uplink, an energy measurement unit for a despread signal, and a low-pass filter on a time axis for measured energy. When an amount of interference detected by the signal measurement device in this manner is greater than a predetermined level, information on a spreading code in which interference is detected and information on a detected time may be transmitted to the mobile communication base station. Such a transmission may be directly performed by the signal measurement device to the base station, or performed by the signal measurement device to a location measurement server, and then, the location measurement server can transmit this to the base station. However, in general, in the case of the W-CDMA, since the number of spreading codes used in uplink is too large, it may be therefore very complicate to detect the presence of an interference source and a spreading code used by the interference source. In this instance, the mobile communication network can provide in advance information on spreading codes with high probability of being related to the interference source to the signal measurement device. As a consequence, a complexity of the signal measurement device may be reduced. Such information may be requested from the signal measurement device when the signal measurement device cannot normally operate due to corresponding interference, and then, after receiving the request, the mobile communication system can transmit the information.

The uplink signal measurement unit 810 of FIG. 8 may be used in systems such as the LTE etc. A PUCCH for transmitting control information and a PUSCH for transmitting data are present in uplink of the LTE system. According to situations, an interference source may transmit the PUCCH or the PUSCH. Information on an interference source in the LTE system may be signaled to the mobile communication system using various methods.

In one example, great reception power may be received at a specific time and/or frequency. In this situation, by measuring power of a signal transmitted at the corresponding frequency and/or time, when the measured power of the signal is greater than or equal to a predetermined threshold value, information on detected uplink resources including information on the frequency and time may be signaled to a base station of the mobile communication network. In the case of the LTE, as several terminals may use a resource configured with the same time and the same frequency in CDM scheme, information on a code used by a signal detected as having greater intensity, a corresponding SRS, and information on whether a detected channel is the PUCCH or the PUSCH may be signal to the base station.

In another example, one of measurable channels may be a sounding reference signal (SRS). As the SRS is transmitted in the CDM scheme in the same manner as the PUCCH, time information of the SRS in which interference is detected, and information on a used code may be transmitted to the base station. That is, the signal measurement device can transmit, to the base station, the time information, the frequency information, the used code information, and the channel information, related to detecting an interference source. In another example, the signal measurement device can transmit such information to a location measurement server, and then, the location measurement server can transmit the information to the base station.

In a state where the mobile communication system retains a table including a resource assigned for each user and an identification number of a terminal, such as an RNTI or a TMSI, the mobile communication system can determine a terminal using a resource reported by the signal measurement device as an interference source, and change resource assignment for a frequency or a time to the terminal. In another example, a spreading code assigned to an interference source terminal may be set to a different spreading code. In another example, after resource assignment to an interference source is changed, this may be signaled to a signal measurement device according to aspects of the present disclosure. In another example, the change of the resource assignment may be signaled to a location measurement server, and then, the signal measurement device can signal this to the signal measurement device.

The uplink signal measurement unit 810 of the signal measurement device of FIG. 8 can receive an uplink signal for a target terminal and/or an uplink signal for an interference source. However, the reception of an uplink signal for an interference source by the uplink signal measurement unit 810 may denote a situation where a signal from a target terminal is not normally received, or an SINR of the signal from the target terminal is not high. The embodiments related to FIG. 8 have been discussed based on uplink signal reception in the LTE. However, it should be noted that the above receiver may be available in the GSM or W-CDMA system by modifying one or more specific schemes for measurement.

Figure 9:
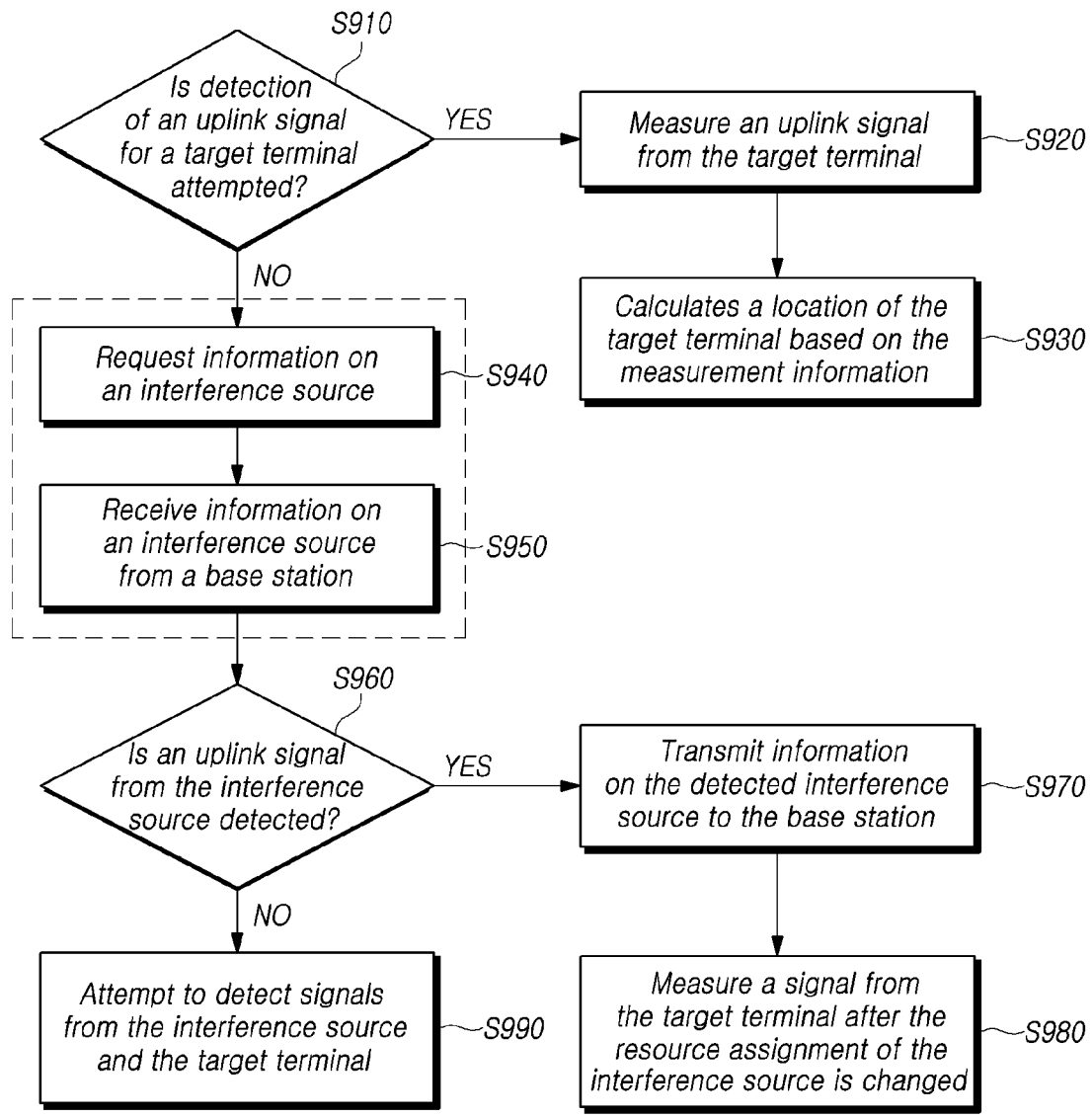
FIG. 9 is a flowchart to show that a signal measurement device measures an interference source and signals information on a result of the measurement to a mobile communication network according to one aspect of the present disclosure.

FIG. 9 illustrates a flowchart for a process of measuring an interference source and signaling measurement information to a mobile communication network in a signal measurement device according to one aspect of the present disclosure.

FIG. 9 shows one or embodiments of detecting a signal from a target terminal in the LTE system; however, it should be noted that such operation may be applicable in even GSM and W-CDMA systems substantially equally or similarly. Referring to FIG. 9, the signal measurement device attempts to detect a signal for a target terminal, at step S910. When a signal for the target terminal is detected, the signal measurement device measures an uplink signal from the target terminal, at step S920. The signal measurement device calculates a location of the target terminal based on the measurement information, at step S930. That is, in one embodiment, this process can be performed in the signal measurement device. In another embodiment, this process can be performed such that the signal measurement device transmits the measurement information to a location measurement server, and then, the location measurement server calculates the location of the target terminal based on the measurement information.

When a signal for the target terminal is not detected, the signal measurement device can attempt to detect an interference source, at step S960. To do this, the signal measurement device can request information on an interference source from an associated mobile communication system, at step S940. The signal measurement device can use information on an interference source received from the mobile communication system to detect the interference source, at step S950. This process is represented as a box outlined by dotted lines. The process of receiving interference source information as indicated by the dotted lines may be omitted according to systems. The interference source information may include identification information used by a terminal that may be an interference source, such as an RNTI, and the like. Further, resource information, such as a channel type, a frequency, a time, a code, and the like, of a resource used by a terminal that may be an interference source may be transmitted to the signal measurement device. The signal measurement device attempts to detect a signal for an interference source, at step S960. When an uplink signal from the interference source is detected, the signal measurement device transmits information on the detected interference source to a base station or the mobile communication system so that the base station or the mobile communication system can change resource assignment for the interference source, at step S970. After the resource assignment of the interference source is changed, the signal measurement device attempts to detect and measure a signal from a target terminal, at step S980. When an uplink signal from the interference source is not detected, the signal measurement device can continually perform detection for one or more interference sources including the interference source, as well as the target terminal, at step S990.

Figure 17:
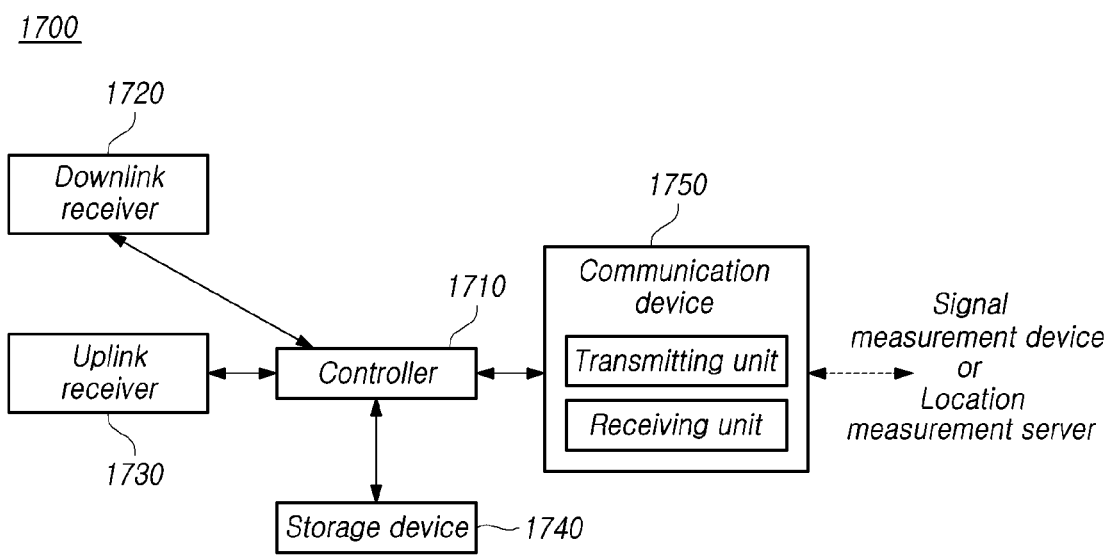
FIG. 17 illustrates a base station according to one aspect of the present disclosure.

FIG. 17 illustrates a base station according to one aspect of the present disclosure.

A base station according to aspects of the present disclosure can include a controller 1710 for controlling the overall operation of the base station, a downlink transmitter 1720 for transmitting a downlink signal, an uplink receiver 1730 for receiving an uplink signal, a storage device 1740 for storing information used for operation of the base station, and the like, and a communication device 1750 including a receiving unit and a transmitting unit. Elements of base stations described herein are not limited to the configuration shown in FIG. 17. Thus, base stations according to aspects of the present disclosure may include elements more, or less, than these elements.

The receiving unit of the communication device 1750 of the base station can receive interference occurrence information indicating that interference has occurred in an uplink signal of a target terminal from a signal measurement device or a location measurement server. The controller 1710 of the base station can adjust uplink resource assignment of another terminal that has caused interference in the uplink signal of the target terminal based on the interference occurrence information. The receiving unit and transmitting unit of the communication device 1750 are for communication with the signal measurement device or the location measurement server. In one embodiment, the receiving unit and transmitting unit of the communication device 1750 may be separately configured from the downlink transmitter 1720 for transmitting a signal to a mobile communication terminal and the uplink receiver 1730. In another embodiment, the receiving unit of the communication device 1750 and the uplink receiver 1730 may be integrated into a single device for being operated or implemented as the singly device. Likewise, the transmitting unit of the communication device 1750 and the downlink transmitter 1720 may be integrated into a single device for being operated or implemented as the singly device. In another embodiment, the receiving unit and transmitting unit of the communication device 1750 may be connected with the location measurement server through a wired connection.

Specifically, in another embodiment, the controller 330 can change a frequency band of at least one other terminal that has caused interference in a frequency band assigned to the target terminal to a frequency band that does not cause interference in the frequency band assigned to the target terminal.

In another embodiment, the controller 330 can change an uplink signal transmission time of at least one other terminal that has caused interference at an uplink signal transmission time assigned to the target terminal to a transmission time that does not cause interference at the uplink signal transmission time assigned to the target terminal.

The receiving unit of the communication device 1750 can receive, from the signal measurement device or the location measurement server, a request signal requesting information on terminals that may transmit an uplink signal at an uplink resource of the target terminal. If the receiving unit of the communication device 1750 receives the request signal, the base station can transmit information on at least one other terminal that may transmit an uplink signal at the uplink resource of the target terminal to the signal measurement device or the location measurement server via the receiving unit of the communication device 1750.

In another example, the receiving unit of the communication device 1750 can receive interference source information including identification information of at least one other terminal from the signal measurement device or the location measurement server. In this situation, based on the identification information of the at least one other terminal, the controller 1710 can assign an uplink resource of the at least one other terminal as a resource that does not cause interference in an uplink signal from the target terminal.

Figure 10:
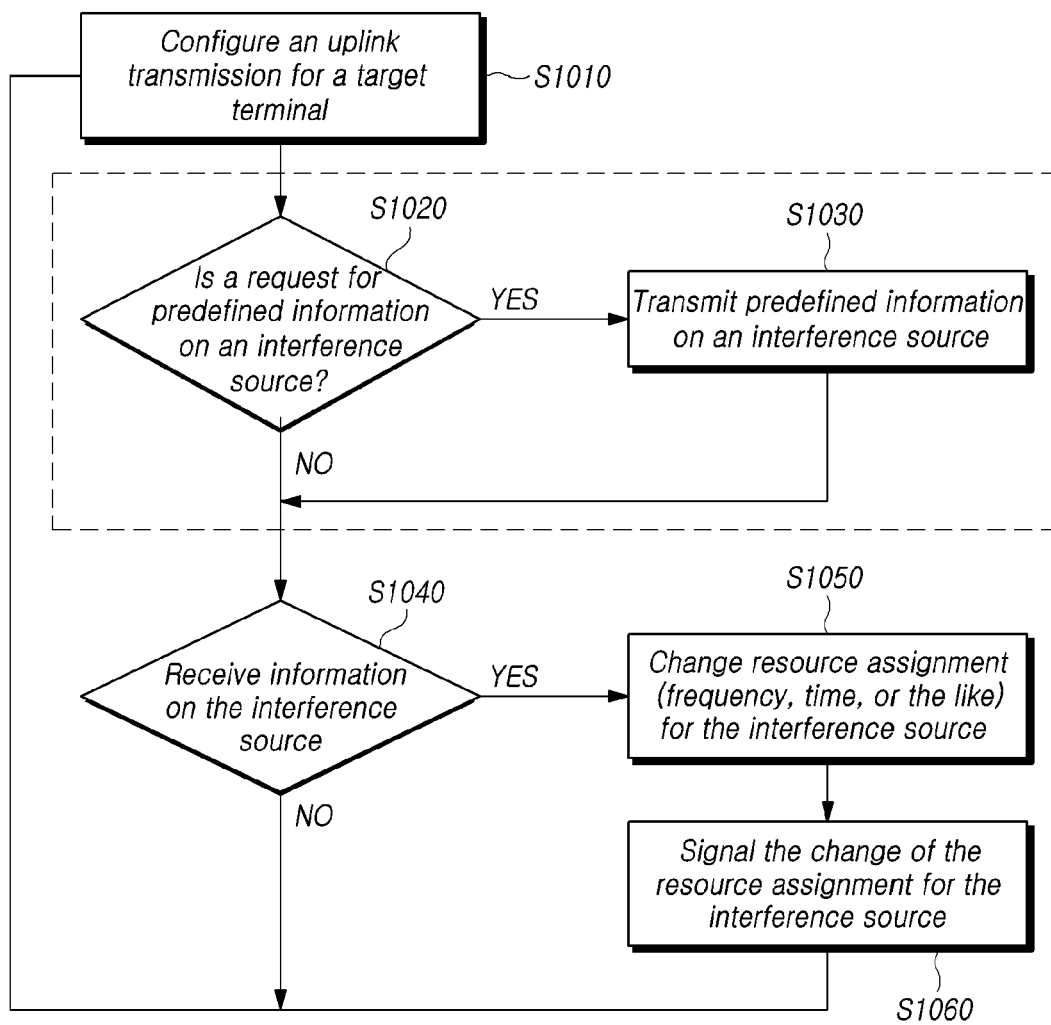
FIG. 10 is a flowchart to show operation of a mobile communication base station according to one aspect of the present disclosure.

FIG. 10 is a flowchart to show operation of a mobile communication base station or a mobile communication system according to one aspect of the present disclosure. FIG. 10 shows one or embodiments related to operation of a mobile communication system in the LTE system; however, it should be noted that such operation may be performed in even GSM and W-CDMA systems substantially equally or similarly.

Referring to FIG. 10, the base station determines a configuration for an uplink signal transmission of a target terminal, at step S1010. The base station can enable the target terminal to transmit an uplink signal by establishing a link with the target terminal according to a request of a signal measurement device or a location measurement server.

The base station determines whether the signal measurement device or the location measurement server requests predefined information on an interference source, at step S1020. When the base station receives the request for the predefined information on an interference source, the base station transmits predefined information on an interference source to the signal measurement device or the location measurement server, at step S1030. The transmitted information may include an RNTI, an uplink spreading code, resource assignment information, parameters of a corresponding link, and the like, used by a terminal that may become an interference source. In this process, transmitted parameters may be differently set according to communication systems used by the target terminal. Further, a box outlined by dotted lines means that the process of transmitting information on an interference source may be omitted according to communication systems.

Thereafter, the base station can receive information on the interference source measured by the signal measurement device from the signal measurement device or the location measurement server, at step S1040. When receiving the interference source measured by the signal measurement device, the base station can change resource assignment of at least one of the interference source and the target terminal so that the interference source and the target terminal cannot cause, or can reduce, interference to each other, at step S1050. In this process, the resource of a frequency, or time, used by the interference source may be changed. When the change of the resource assignment is performed, this may be provided to the signal measurement device, at step S1060, and a process of detecting a signal from a target terminal in a subsequent environment may be progressed.

In this manner, even when the above method is implemented for preventing or removing interference from at least one interference source by providing the information on the interference source detected by the signal measurement device to an associated mobile communication network, there is a probability that interference from all interference sources cannot be prevented or removed. Considering this situation, the mobile communication system can configure a target terminal to transmit a broadbend PUSCH signal at a predetermined time interval or periodically. In this situation, if one or more other users or terminals are configured not to transmit a PUSCH at the same time, interference from the other users or terminals may be reduced or prevented.

However, in the case of the LTE system, even when only a target terminal is allowed to transmit a PUSCH, another terminal in the same cell may transmit a PUCCH. In this situation, the PUCCH may act as interference in the PUSCH. The PUCCH may be configured not to be transmitted at a time at which the target terminal transmits the PUSCH. That is, one or more times for transmitting the PUCCH may be not assigned to other terminals, and in this situation, only the target terminal may be allowed to transmit the PUSCH at the one or more times.

In another embodiment, information on a band used for the PUCCH may be provided to a signal measurement device according to aspects of the present disclosure, and resource assignment may be performed such that only the target terminal can be allowed to transmit the PUSCH. The signal measurement device may receive an uplink signal using a reception filter with a band narrower than a bandwidth of the system at a time at which the target terminal transmits the PUSCH, and thus, it is possible to minimize interference that may be caused in the PUCCH.

Figure 11:
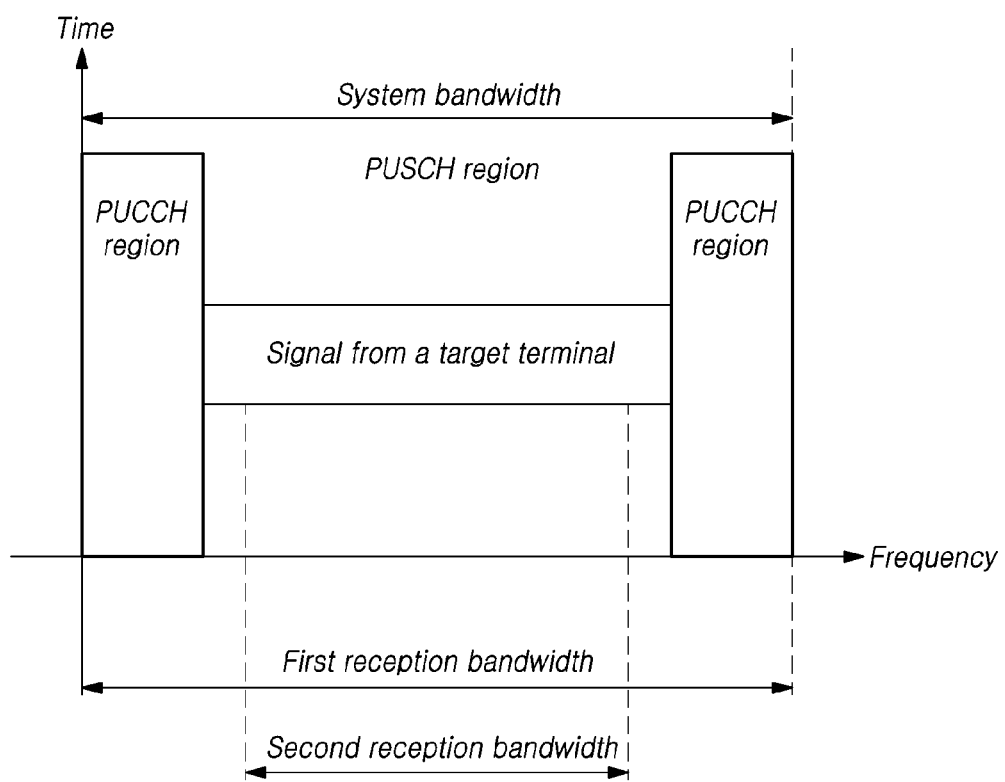
FIG. 11 illustrates an uplink signal reception bandwidth controlled by a signal measurement device according to one aspect of the present disclosure.

FIG. 11 illustrates one or embodiments related to reducing an uplink signal reception bandwidth according to one aspect of the present disclosure. The uplink of the LTE system is made up of both side regions for transmitting PUCCH and a middle region for transmitting PUSCH. A TTI for transmitting the PUSCH may be assigned by avoiding a TTI configured with a resource assigned by random access. The vertical axis of the upper half represents time and the horizontal axis represents the frequency axis. The entire system bandwidth is divided into the PUCCH regions and the PUSCH region. In general, an uplink receiver is configured to receive the entire system bandwidth. A first reception bandwidth shown in FIG. 11 represents a broad reception bandwidth for a signal measurement device. According to one or more embodiments shown in FIG. 11, a mobile communication system can transmit information on a region used for the PUCCH to the signal measurement device. Based on this information, the signal measurement device can receive an uplink signal by reducing the available uplink reception bandwidth at a time at which a target terminal transmits a broadbend signal. A second reception bandwidth shown in FIG. 11 represents the reduced reception bandwidth of the signal measurement device. Further, after the time has passed, the signal measurement device can receive a signal by changing from the reduced reception bandwidth to the broad reception bandwidth. That is, the signal measurement device can receive a broadbend PUSCH from the target terminal using the reduced reception bandwidth (i.e. the second reception bandwidth) at a time at which the target terminal transmits the broadbend PUSCH. In the remaining period, the signal measurement device can receive a signal using the broad reception bandwidth (i.e. the first reception bandwidth).

When transmitting the uplink PUSCH, it is possible to transmit only one PUSCH at a time, or transmit the PUSCH along with one or more other channels at the same time. That is, by configuring a certain range of guard bands in the frequency axis in a PUSCH signal that is a channel transmitted by the target terminal for measurement, resource assignment for other terminals may be performed so that other terminals cannot transmit signals in the guard bands.

Figure 12:
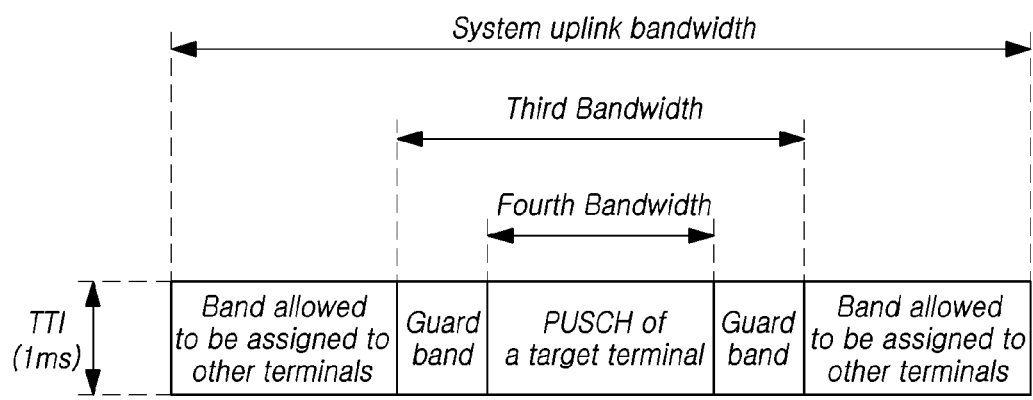
FIG. 12 illustrates a configuration of an uplink channel according to one aspect of the present disclosure.

FIG. 12 illustrates one or more embodiments related to a PUSCH using guard bands according to one aspect of the present disclosure. In FIG. 12, the vertical axis represents time and the horizontal axis represents frequency. Referring to FIG. 12, guard bands are configured in both sides of the PUSCH that is an uplink channel transmitted by a target terminal for measurement. An equal number of frequencies may be assigned to the two guard bands. When a base station configures a bandwidth for allowing the target terminal to transmit an PUSCH signal, the base station does not assign guard bands adjacent to the configured bandwidth as uplink resources for other terminals. In this situation, in one embodiment, resource assignment for the target terminal may be allowed in the guard bands. There are present frequency bands that are allowed to be assigned to other terminals in respective sides of the guard bands. Resource assignment for other terminals may be performed in these bands. The bands that are allowed to be assigned to other terminals may include a band assigned as a PUCCH.

A signal measurement device can measure an uplink signal from the target terminal in two different bandwidths, as in FIG. 11. A system uplink bandwidth shown in FIG. 12 corresponds to the first uplink reception bandwidth of shown in FIG. 11. A PUSCH that is an uplink signal transmitted by the target terminal may be received in the second uplink reception bandwidth that is smaller than the system uplink bandwidth. The signal measurement device can set a bandwidth smaller than a third bandwidth of FIG. 12 as the uplink second reception bandwidth. That is, an uplink signal may be received by configuring an uplink receiver including an analogue filter to be operated in the second reception bandwidth. In this manner, uplink signals received from other terminals can be minimized. In one embodiment, a bandwidth of an uplink signal receiver for receiving an uplink signal from a target terminal may be configured to be smaller than the third bandwidth and larger than a fourth bandwidth. In another embodiment, a bandwidth of an uplink signal transmitter of the target terminal may be configured to be smaller than the third bandwidth and larger than the fourth bandwidth to transmit a signal.

In order to efficiently design a signal measurement device, information on a width of the guard bands is required to be provided to the signal measurement device. A base station of a mobile communication network can provide this information to the signal measurement device. This may be also performed such that the base station transmits such information to a location measurement server, and then, the location measurement server transmits the information to the signal measurement device. In another embodiment, a width of the guard bands may be defined in advance between the base station and the signal measurement device. In another embodiment, one or more widths of the guard bands may be defined in advance between the base station and the signal measurement device, and thereafter, one of the predefined widths may be used.

For example, in a situation where an uplink band is 10 MHz, while a target terminal transmits a broadbend PUSCH, the signal measurement device can change a reception bandwidth to a band of 5 MHz to receive the broadbend PUSCH. In the remaining periods, the signal measurement device can receive a signal in the bandwidth of 10 MHz. In this situation, while the target terminal transmits the broadbend PUSCH, the signal measurement device can use a reception filter of a bandwidth smaller by one level than a using uplink bandwidth among bandwidths defined in LTE standards. For example, a 5 MHZ bandwidth in a system of a 10 MHz bandwidth may be used as the second reception bandwidth, or a 15 MHz bandwidth in a system of 20 MHz may be used as the second reception bandwidth. As a consequence. it is possible to measure a signal without an effect on interference caused from a PUCCH. It is also possible to reduce interference caused from directly adjacent uplink frequency bands.

The implementation of the signal measurement device may be complicated according to configurations of second reception bandwidth. In the LTE and 5G systems, some available bandwidths are defined in uplink, these systems are operated in one of these bandwidths. The signal measurement device can be implemented without great increase in complexity when values corresponding to such defined uplink bandwidths are set to the second reception bandwidth.

In another embodiment, the signal measurement device may receive a signal from a target terminal only in the second reception bandwidth which is a narrow bandwidth. However, in this embodiment, there is a probability that the signal measurement device may not normally receive a PUCCH or an SRS transmitted by the target terminal. Therefore, it may be advantageous for a reception bandwidth to be varied according to situations.

In the above process, when a signal measurement device according to aspects of the present disclosure changes to a narrow bandwidth, there is a probability that a part of a PUSCH signal transmitted by a target terminal may not be used. In this instance, a signal measurement device according to aspects of the present disclosure can signal the change of a reception bandwidth to a mobile communication network, and the mobile communication network can set a bandwidth of a PUSCH assigned to a target terminal taking account of such changed bandwidth. That is, the target terminal may be allowed to transmit a signal of a bandwidth smaller than the first broadbend reception bandwidth through a PUSCH. In this process, by providing information on a reception bandwidth used by the signal measurement device to the mobile communication network, the mobile communication network can adjust a PUSCH bandwidth taking this into account. In another example, the signal measurement device or a location measurement server may be allowed to directly request a bandwidth of a PUSCH used by the target terminal from the mobile communication network, and then, the associated mobile communication system can reflect this.

In the above process, when multiple signal measurement devices measure a location of a target terminal, all signal measurement devices measuring a signal from the same target terminal are required to change respective reception bandwidths simultaneously. In this situation, respective reception bandwidths of the signal measurement devices may be simultaneously changed, by allowing the location measurement server to determine a change of the reception bandwidth comprehensively considering situations of the signal measurement devices, and then provide this to the signal measurement devices.

In another embodiment, when a signal measurement device according to aspects of the present disclosure is required to individually adjust a reception bandwidth by determining the occurrence of interference, the signal measurement device can signal this to a location measurement server, and then, the location measurement server can either signal bandwidth adjustment to an associated mobile communication network based on this information, or request the mobile communication network to adjust a PUSCH signal bandwidth of a target terminal.

Figure 13:
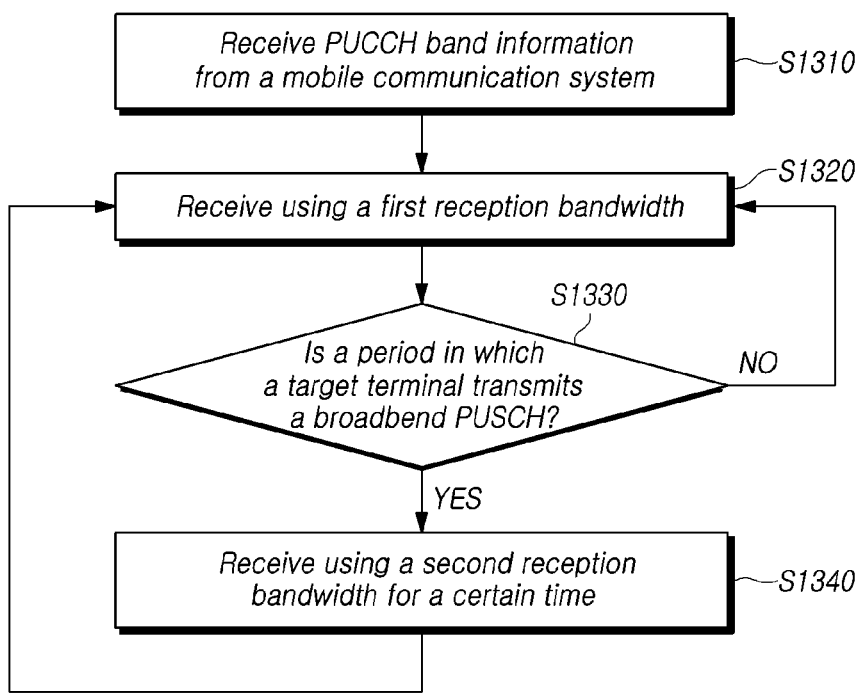
FIG. 13 is a flowchart to show that a signal measurement device controls an uplink signal reception bandwidth according to one aspect of the present disclosure.

FIG. 13 is a flowchart to show a change of an uplink bandwidth used by a signal measurement device according to one aspect of the present disclosure. Referring to FIG. 13, the signal measurement device receives information on a band in which a PUCCH is used from an associated mobile communication system, at step S1310. Although this process may be omitted, it should be noted that based on this, an uplink reception filter of the signal measurement device can be efficiently designed. In a normal situation, the signal measurement device operates in a first reception bandwidth, at step S1320. Here, the first reception bandwidth denotes an LTE uplink bandwidth used by a target terminal in actual. The bandwidth may mean a bandwidth used by a receiver of a base station for receiving an LTE uplink signal in one band.

The signal measurement device determines whether a target terminal transmits a broadbend PUSCH for measurement, at step S1330. When it is determined that the target terminal does not transmit the broadbend PUSCH, the signal measurement device receives a signal using the first reception bandwidth that has been already used. On the other hand, when it is determined that the target terminal transmits the broadbend PUSCH, the signal measurement device operates using a second reception bandwidth smaller than the first reception bandwidth, at step S1340. Further, after the target terminal completes a PUSCH transmission for measurement, the signal measurement device changes from the second reception bandwidth to the first reception bandwidth. Discussions have been conducted on situations where a PUSCH transmitted by the target terminal for measurement is configured in broadbend; however, it should be noted that even when a PUSCH configured in narrowband is used, a location of the target terminal can be measured.

In the case of the LTE system, a terminal can transmit a PUCCH or an SRS in uplink. A location measurement device or a signal measurement device can measure a location of a target terminal using at least one of these channels. However, the PUCCH and the SRS are allowed to carry signals using different codes by multiple terminals at an identical frequency or time resource. As such, when other terminals transmit signals using different codes at an uplink resource used by a target terminal, there is a probability that it is not easy for the location measurement device to detect and measure a signal from the target terminal due to interference.

In the present disclosure, to address this issue, there is provided a method of not assigning, to one or more other terminals, the same uplink resource as a resource of an SRS or a PUCCH used by a target terminal for transmitting a signal. That is, one or more other terminals are not allowed to transmit signals at a time or a frequency at which the target terminal transmits the SRS or the PUCCH. As a consequence, it is possible to improve a performance of the location measurement device for detecting and measuring a signal from the target terminal.

In another embodiment, while resources of one or more other terminals are allowed to be configured at a resource used by the target terminal for transmitting the SRS or the PUCCH, one or more other terminals that are determined to have low interference influence may be allowed to transmit uplink signals. This implementation is available in a situation where one or more other terminals are far away from the target terminal or the location measurement device. To do this, a base station determines an approximate location of the target terminal or the location measurement device, and determines whether one or more other terminals are far away from the determined location and thus have low interference influence. When it is determined that one or more other terminals have low uplink interference influence, the base station can assign an SRS or PUCCH resource used by the target terminal to the one or more other terminals.

To implement such determination, the base station can use location estimation values of one or more other terminals and a location measurement value of the target terminal. Further, the base station can use values of locations of one or more other terminals and the target terminal, which are received from a location measurement server. In this situation, a downlink channel state (RSRP, RSRQ) measured by any terminal, measurements obtained by a base station adjacent to the terminal, uplink transmission power information of the terminal, and the like can be used to estimate the location information.

Through the above processes, by not assigning a corresponding uplink frequency or time to an interference source, or by using a different resource assignment depending on interference sources, an uplink signal from a target terminal can be easily detect. However, even when the above methods are used, there may occur a situation where interference may not be easily controlled. Taking account of this situation, a method is provided for controlling interference of an uplink frequency.

A method according to aspects of the present disclosure can be implemented by instructing one or more terminals using a corresponding frequency used by a target terminal and present in the same cell as the target terminal to change to one or more other frequencies. This implementation is available to all or some terminals in an active state. The active state means a state in which voice and/or data communication is maintained between a terminal and a base station. According to situations, a terminal in a standby state may be regarded as a potential interference source and instructed to change to another frequency. In particular, one or more terminals determined as being placed in the vicinity of a target terminal are selectively instructed to move to one or more other frequency bands.

In one embodiment, there is provided a method of moving all or a part of one or more terminals in the active state at a corresponding frequency used by the target terminal to one or more other frequencies. This method may be implemented by including a terminal not reported by a device according to aspects of the present disclosure as an interference source. Further, this method may be implemented by allowing all terminals in a corresponding cell to be moved to other frequencies, or by allowing only one or more terminals satisfying a specific condition to be moved to one or more other frequencies. This may be performed through a process of changing a service frequency of a terminal in the active state. The one or more terminals satisfying the specific condition may denote one or more terminals in a situation where one or more of measurement values of a downlink channel state, RSRP, RSRQ, and the like are in a certain range or level. Under such a condition, a terminal that is determined to be, or to probably be, in the vicinity of the target terminal may be instructed to move to a different frequency. In the above process, a mobile communication base station can instruct one or more terminals to report a downlink channel state, location information, and the like, and based on the received report, instruct one or more terminals that are determined to be in the vicinity of the target terminal to move to one or more different frequencies. Further, when a transmission power value of a terminal satisfies a predefined condition, the base station can instruct the terminal to move to a different frequency. In another embodiment, a terminal transmitting uplink data over a specific number of times or a specific date rate may be instructed to move to a different frequency.

However, when the above process is performed, there is a probability that using efficiency of the corresponding frequency may be reduced, and it is therefore desired to employ a more efficient method. To address this issue, in the present disclosure, all or a part of one or more terminals in the active state may be instructed to periodically suspend transmissions in a corresponding frequency for a short time, and instead, a target terminal may be allowed to transmit an uplink signal for this time. In another embodiment, a base station may command all or a part of one or more terminals in the active state to periodically move from a frequency being in use to another frequency for a short time, and instead, allow a target terminal to transmit an uplink signal for this time. When the predefined short time passes, one or more terminals having performed such a frequency chance are allowed to move back to the previous frequency to perform normal communication. One embodiment according to methods described above may be referred to as "inter frequency search". When a base station commands the inter frequency search, one or more terminals receiving the command are required to perform operation of searching another frequency at an instructed time, and therefore, suspend uplink transmissions temporarily. The base station can command all or a part of one or more terminals in the active state in a frequency band used by a target terminal and/or in the same cell as the target terminal to perform the inter frequency search. When a part of the one or more terminals is selected, by selecting one or more terminals satisfying a specific condition, such one or more terminals are instructed to perform the inter frequency search. The specific condition may be measurement values of a downlink channel state, RSRP, RSRQ, and the like within a certain range or level. Under such a condition, a terminal that is determined to be in the vicinity of the target terminal may be instructed to perform the inter frequency search. In the above process, the mobile communication base station can instruct one or more terminals to report a downlink channel state, location information, and the like, based on the received report, select one or more terminals that are determined to be in the vicinity of the target terminal, and instruct the one or more selected terminals to perform the inter frequency search. Further, when a transmission power value of a terminal satisfies a predefined condition, the base station can instruct the terminal to perform the inter frequency search. In another embodiment, one or more terminals transmitting uplink data over a specific number of times or a specific date rate may be selected.

Further, all of the terminals are configured to perform the search of other frequencies or another frequency at the same time. Further, by setting an identical search period, times at which multiple terminals move to other frequencies or another frequency and search may be overlapped. At this time, the target terminal is allowed to transmit an uplink signal. In the above process, since a signal transmitted by the target terminal becomes a broadbend signal, it is possible to configure a time delay to be measured accurately. In particular, according to embodiments described herein, the target terminal is allowed to transmit a broadbend PUSCH.

As described above, using the inter frequency search, by causing all or a part of one or more terminals in the active state not to transmit an uplink signal for a certain time, and allowing a target terminal to transmit an uplink signal for this time, based on this, a signal measurement device can measure the signal of the target terminal with a high performance. Further, such an embodiment of not allowing an uplink signal to be transmitted for a certain time may be applicable to a terminal in the standby state. That is, since a terminal in the standby state is allowed to transmit random access, and the like, therefore, the terminal in the standby state is configured not to transmit an uplink signal for a certain time, and this time may be configured to overlap with a time at which one or more terminals in the active state perform the inter frequency search.

Figure 14:
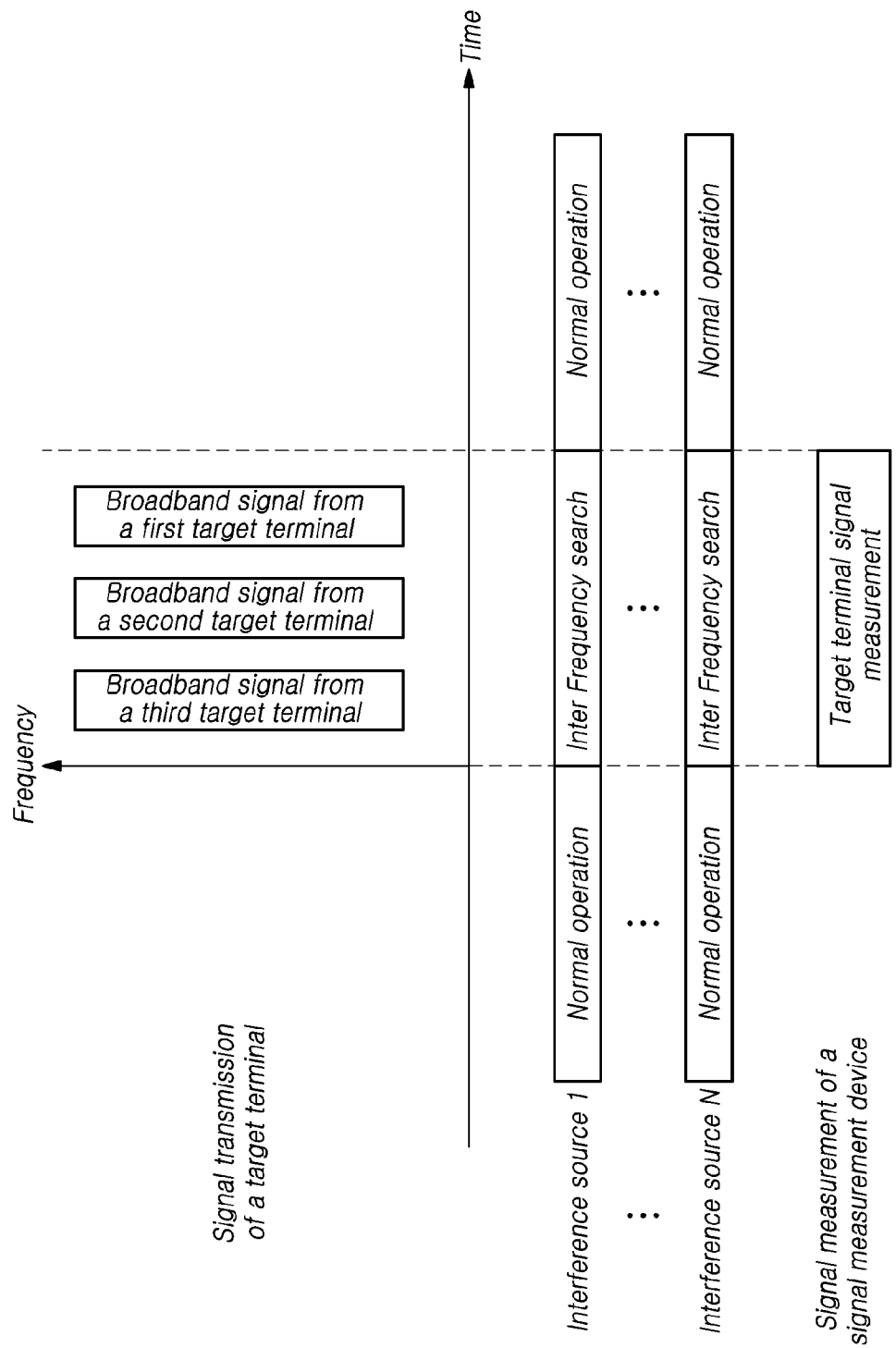
FIG. 14 illustrates a time at which one or more other terminals in an active state perform an inter frequency search and a method in which a target terminal transmits an uplink signal according to one aspect of the present disclosure.

FIG. 14 illustrates a time at which one or more other terminals in the active state perform the inter frequency search and a method in which a target terminal transmits an uplink signal according to one aspect of the present disclosure. Referring to FIG. 14, there is shown a process of allowing one or more terminals that are, or may be, interference sources in the active state to simultaneously perform the inter frequency search, and allowing a target terminal to transmit a signal during such a time at which the one or more terminals perform the inter frequency search. In this process, all of one or more terminals in the active state that may be interference sources can be configured to perform the inter frequency search during an identical time. FIG. 14 shows one or embodiments related to a situation where N number of terminals that may be interference sources performs the inter frequency search. In the above process, all or a part of one or more terminals in the active state in a cell or frequency band in which a target terminal belongs are configured to perform the inter frequency search. In this situation, all of terminals that may be interference sources may be configured to perform the inter frequency search at an identical time and for an identical time. Such an inter frequency search is one of embodiments of not allowing a terminal to transmit an uplink signal for this time. Using another similar method of not allowing one or more terminals in the active state to transmit uplink transmissions for one or more predetermined partial times, it is possible to configure the uplink transmissions to be suspended, and configure a target terminal to transmit an uplink signal for measurement for the one or more predetermined partial times. In this situation, as multiple terminals simultaneously suspend uplink signal transmissions, if respective time periods where the terminals suspend the uplink signal transmissions are configured to become the same time period, corresponding measurement may be more efficiently performed.

Referring to FIG. 14, there is provided a method of configuring an uplink transmission in a situation where multiple target terminals are placed. FIG. 14 shows one or more embodiments related to a scenario where 3 target terminals are allowed to transmit a broadbend signal in one inter frequency search period using a time division multiple access scheme. That is, the target terminal is allowed to transmit a signal for a time for which one or more terminals that may be interference sources suspend uplink signal transmissions. When locations of multiple target terminals are required to be measured, in order to minimize interference between signals transmitted by the target terminals, there is provided a method of allowing the target terminals to transmit respective signals at times different from one another.

Figure 15:
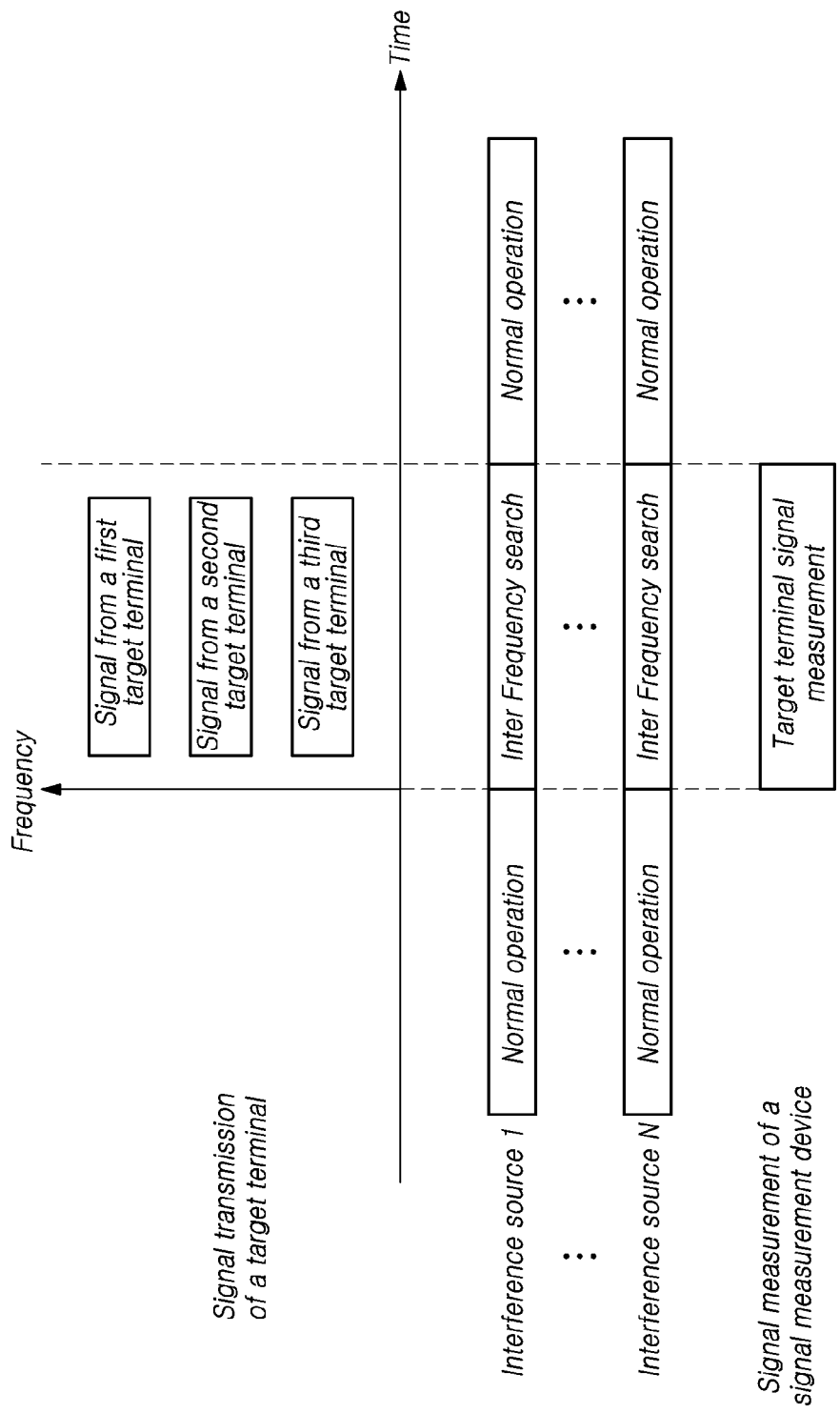
FIG. 15 illustrates a signal transmission method of a target terminal according to another aspect of the present disclosure.

FIG. 15 illustrates a method of allowing one or more target terminals to transmit respective signals according to another aspect of the present disclosure. Embodiments related to FIG. 15 are similar to the embodiments related to FIG. 14. When one or more target terminals perform the inter frequency search in periods in which one or more terminals in the active state that may be interference sources suspend uplink signal transmissions, the target terminals are allowed to transmit signals using the FDM scheme. This enables a time in which each target terminal transmits a signal to be increased, and thereby, a signal from the target terminal to be detected at a long distance from the target terminal. FIG. 15 shows that each of the target terminals transmits an uplink signal in a frequency band different from one another. Using a method similar to this, it is possible to configure the target terminals to transmit broadbend schemes using the CDM scheme. A signal measurement device according to aspects of the present disclosure can measure a location of at least one target terminal by measuring a signal from the target terminal.

In embodiments related to FIGS. 14 and 15, a signal measurement device according to aspects of the present disclosure can measure a signal from at least one target terminal in a period in which the at least one target terminal transmits a signal. When signals from multiple target terminals are required to be measured, respective signals from the target terminals can be measured. A mobile communication system or a location measurement server according to aspects of the present disclosure can transmit, to a signal measurement device, information on periods (i.e. a period for performing the inter frequency search) in which one or more terminals in the active state that may be interference sources suspend uplink signal transmissions. That is, this may be directly transmitted by the mobile communication base station to the signal measurement device. In another example, the base station can provide this the location measurement server, and then, the location measurement server can transmit this to the signal measurement device. The signal measurement device receiving the information performs operation of a receiver including an AGC operation considering that the one or more terminals in the active state suspend uplink signal transmissions. In another example, the mobile communication base station and the signal measurement device can perform the operation at a predefined time or period. In another example, in this situation, a transmission scheme of a signal transmitted by a target terminal and parameters may be defined in advance between the base station and the signal measurement device.

A process of transmitting information on resource assignment for allowing the target terminal to transmit a signal may be performed such that a signal measurement device according to aspects of the present disclosure can receive information on a PDCCH that is a downlink channel on which the base station assigns a resource to the target terminal, and detect a signal from the target terminal. Further, when needed, the signal measurement device may receive information on a PDSCH that is a downlink data channel. The signal measurement device receiving this information can detect uplink signals from target terminals based on information on the PDCCH. In another example, the mobile communication base station or the location measurement server can transmit the information to the signal measurement device in advance. That is, this information can be directly transmitted by the base station to the signal measurement device. In another example, the base station can transmit this information to the location measurement server, and then, the location measurement server can transmit the information to the signal measurement device. Based on this information, the signal measurement device can detect a signal from the target terminal. In this situation, by receiving the PDCCH, the signal measurement device can detect a signal from the target terminal without receiving uplink resource assignment information of the target terminal. In another embodiment, the uplink resource assignment information and information on the inter frequency search may be defined in advance a base station and a signal measurement device according to aspects of the present disclosure.

According to embodiments described herein, in a device including a communication device including a downlink signal receiver and one or more uplink signal receivers, performing a process of acquiring time synchronization to an associated base station and acquiring uplink resource assignment information of a target terminal using the downlink signal receiver, based on this, determining whether an uplink signal that may be transmitted by the terminal to the base station is present, and determining the presence or absence of the target terminal and location information, it is possible to improve a performance of receiving an uplink signal transmitted by the target terminal. However, it should be noted that embodiments described herein may be applicable to a signal measurement device including only one or more uplink receivers to detect a signal from a target terminal.

In the present disclosure, by providing a process of acquiring information on a terminal that acts, or may act, as an interference source in an uplink signal from a target terminal, and providing this to a mobile communication system, and based on this, by configuring the terminal that may be the interference source with an uplink resource different from an uplink resource assigned to the target terminal, it is possible to reduce interference in an uplink signal from the target terminal.

In the above process, the base station can configure the terminal that may act as the interference source to use an uplink frequency band different from a frequency band used by the target terminal, and it is therefore possible to reduce uplink interference of the target terminal.

In present disclosure, by configuring an uplink reception bandwidth of a signal measurement device to be different from a bandwidth of an uplink signal of a target terminal, a signal from the target terminal can be efficiently detected. The above operation based on a change of a reception bandwidth may be performed only when a target terminal transmits a measurement-used uplink signal defined in advance.

By instructing all or a part of one or more terminals in the active state that may be interference sources to perform the inter frequency search at a specific time, and not allowing all or a part of the one or more terminals to transmit uplink signals in a certain period, it is possible to reduce uplink interference of the target terminal. In this period, the target terminal is allowed to transmit an uplink signal for measurement, and the signal measurement device can perform measurement based on the signal.

The terms "system", "processor", "controller", "component", "module", "interface", "model", "unit", and the like, may generally refer to computer-related entity hardware, a combination of hardware and software, software, or software in execution. For example, such elements described above may be, but not limited to, a process driven by the processor, a control processor, an entity, a running thread, a program and/or a computer. For example, when an application runs on a controller or a processor, all of the application, the controller or the processor can become one element. One or more components can be included within a process and/or thread of execution, and a component can be placed on one system or be disposed on more than one system.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

The forgoing has been presented to best explain the embodiments and examples and thereby to enable any person skilled in the art to make and use the invention as claimed. Various modifications, additions and substitutions to the described embodiments and examples will be readily apparent to those skilled in the art without departing from the spirit and scope of the present disclosure. Therefore, exemplary aspects of the present disclosure have not been described for limiting purposes, but to describe the embodiments, the therefore, the scope of the present disclosure shall not be limited to such embodiments. Rather, the scope of protection of the present disclosure should be construed based on the following claims, and all technical ideas or principles within the scope of equivalents thereof should be construed as being included within the scope of the present disclosure.

What is claimed is:

1. A base station comprising a controller configured to, based on an uplink signal transmitted by a target terminal, which is an object of a location measurement, being received by a signal measurement device, to reduce interference between the uplink signal and signals transmitted by one or more other terminals:

allocate second uplink resources, which are different from first uplink resources allocated to the target terminal, to the one or more other terminals, or transmit a signal to stop transmission of the signals transmitted by the one or more other terminals in time resources of the first uplink resources allocated to the target terminal.

2. The base station according to claim 1, when the second uplink resources are allocated to the one or more other terminals, the controller is further configured to allocate different time resources or frequency resources between the target terminal and the one or more other terminals.

3. The base station according to claim 1, wherein the signals transmitted by the one or more other terminals comprise at least one of an uplink data channel, an uplink control channel, or a reference signal.

4. The base station according to claim 1, wherein when the second uplink resources are allocated to the one or more other terminals, the controller is further configured to allocate a predetermined guard band to the uplink signal transmitted by the target terminal, and not allocate uplink resources to the one or more other terminals in the predetermined guard band.

5. The base station according to claim 1, wherein when the signal to stop the transmission of the signals transmitted by the one or more other terminals is transmitted, the controller is further configured to change a service frequency of the one or more other terminals to a frequency in a different frequency band.

6. A base station comprising a controller configured to:
perform a location measurement for a plurality of target terminals, and
allocate uplink resources for the plurality of target terminals to reduce interference between uplink signals received by a signal measurement device,
wherein the uplink signals are transmitted from the plurality of target terminals to the base station.

7. The base station according to claim 6, wherein the controller is further configured to allocate different time resources or frequency resources for each of the plurality of target terminals.

8. The base station according to claim 6, wherein the controller is further configured to allocate different code resources for each of the plurality of target terminals.

9. A signal measurement device comprising:
a controller configured to obtains resource allocation information for an uplink signal transmitted from a target terminal to a base station; and
an uplink signal receiver configured to receive the uplink signal, based on the obtained resource allocation information,
wherein the uplink signal receiver is configured to receive the uplink signal in a bandwidth narrower than an entire system bandwidth for an uplink band allocated to the target terminal.

10. The signal measurement device according to claim 9, wherein the uplink signal receiver comprises an analog filter with the bandwidth narrower than the entire system bandwidth.

11. The signal measurement device according to claim 9, wherein the uplink signal receiver is configured to receive the uplink signal in the bandwidth at a time that the target terminal transmits the uplink signal.

* * * * *